United States Patent
Nikolov et al.

(10) Patent No.: US 6,876,784 B2
(45) Date of Patent: Apr. 5, 2005

(54) OPTICAL POLARIZATION BEAM COMBINER/SPLITTER

(75) Inventors: Anguel Nikolov, Bridgewater, NJ (US); Stephen Y. Chou, Princeton, NJ (US)

(73) Assignee: NanoOpto Corporation, Somerset, NJ (US)

( * ) Notice: Subject to any disclaimer, the term of this patent is extended or adjusted under 35 U.S.C. 154(b) by 22 days.

(21) Appl. No.: 10/158,025

(22) Filed: May 30, 2002

(65) Prior Publication Data

US 2003/0223670 A1 Dec. 4, 2003

(51) Int. Cl.[7] .................................................. G02B 6/27
(52) U.S. Cl. ....................................... 385/11; 359/483
(58) Field of Search ............................. 385/11, 15, 16, 385/18, 33, 47, 48; 359/483, 485–487

(56) References Cited

U.S. PATENT DOCUMENTS

| | | |
|---|---|---|
| 4,615,034 A | 9/1986 | von Gunten et al. |
| 4,638,669 A | 1/1987 | Chou |
| 4,650,289 A | 3/1987 | Kuwahara |
| 4,732,444 A | 3/1988 | Papuchon et al. |
| 4,763,972 A | 8/1988 | Papuchon et al. |
| 4,778,234 A | 10/1988 | Papuchon et al. |
| 4,998,793 A | 3/1991 | Henry et al. |
| 5,077,816 A | 12/1991 | Glomb et al. |
| 5,088,105 A | 2/1992 | Scifres et al. |
| 5,091,981 A | 2/1992 | Cunningham |
| 5,283,845 A | 2/1994 | Ip |
| 5,299,212 A | 3/1994 | Koch et al. |
| 5,461,246 A | 10/1995 | Chou |
| 5,467,415 A | 11/1995 | Presby |
| RE35,337 E | 9/1996 | Patel et al. |
| 5,617,234 A | 4/1997 | Koga et al. |
| 5,654,818 A | 8/1997 | Yao |
| 5,691,989 A | 11/1997 | Rakuljic et al. |
| 5,706,301 A | 1/1998 | Lagerstrom |
| 5,719,976 A | 2/1998 | Henry et al. |
| 5,726,805 A | 3/1998 | Kaushik et al. |
| 5,772,905 A | 6/1998 | Chou |
| 5,777,793 A | 7/1998 | Little et al. |
| 5,793,784 A | 8/1998 | Wagshul et al. |
| 5,820,769 A | 10/1998 | Chou |
| 5,848,080 A | 12/1998 | Dahm |
| 5,852,688 A | 12/1998 | Brinkman et al. |
| 5,870,421 A | 2/1999 | Dahm |
| 5,956,216 A | 9/1999 | Chou |

(Continued)

OTHER PUBLICATIONS

Austin, M., et al., "Fabrication for nanocontacts for molecular devices using nanoimprint lithography," J. Vac. Sci. Technol. B 20(2), Mar./Apr. 2002, pp. 665–667.

Austin, M., et al., "Fabrication of 70 nm channel length polymer organic thin–film transistors using nanoimprint lithography," Appl. Phys. Lett. 81 (23), Dec. 2, 2002, pp. 4431–4433.

(Continued)

Primary Examiner—John D. Lee
Assistant Examiner—Sarah Song
(74) Attorney, Agent, or Firm—Reed Smith LLP

(57) ABSTRACT

An optical device for combining two orthogonally polarized beams or splitting a beam into two orthogonally polarized beams is provided that utilizes two collimating/focusing lenses and a thin film wire-grid polarizer. Because the thin film wire-grid polarizer can be fabricated in very thin profile, the provision of a thin film wire-grid polarizer allows the optical polarization beam combiner/splitter device to be highly integrated and simultaneously realize a number of performance advantages of a thin film wire-grid polarizer over other types of polarizers utilized in various prior art polarization beam combiner/splitters.

35 Claims, 15 Drawing Sheets

U.S. PATENT DOCUMENTS

| | | | |
|---|---|---|---|
| 5,966,483 | A | 10/1999 | Chowdhury |
| 5,973,316 | A | 10/1999 | Ebbesen et al. |
| 5,973,784 | A | 10/1999 | Szwaykowski et al. |
| 6,023,542 | A * | 2/2000 | Pan et al. ............... 385/24 |
| 6,035,089 | A | 3/2000 | Grann et al. |
| 6,037,644 | A | 3/2000 | Daghighian et al. |
| 6,040,936 | A | 3/2000 | Kim et al. |
| 6,052,238 | A | 4/2000 | Ebbesen et al. |
| 6,064,506 | A | 5/2000 | Koors |
| 6,069,380 | A | 5/2000 | Chou et al. |
| 6,075,915 | A | 6/2000 | Koops et al. |
| 6,101,300 | A | 8/2000 | Fan et al. |
| 6,108,131 | A * | 8/2000 | Hansen et al. ............ 359/486 |
| 6,122,103 | A | 9/2000 | Perkins et al. |
| 6,122,301 | A | 9/2000 | Tei et al. |
| 6,125,220 | A | 9/2000 | Copner et al. |
| 6,130,969 | A | 10/2000 | Villeneuve et al. |
| 6,137,939 | A | 10/2000 | Lesesky et al. |
| 6,154,318 | A | 11/2000 | Austin et al. |
| 6,154,479 | A | 11/2000 | Yoshikawa et al. |
| 6,169,825 | B1 | 1/2001 | Morey et al. |
| 6,175,667 | B1 | 1/2001 | Wang et al. |
| 6,191,890 | B1 | 2/2001 | Baets et al. |
| 6,198,557 | B1 | 3/2001 | Dultz et al. |
| 6,198,860 | B1 | 3/2001 | Johnson et al. |
| 6,208,463 | B1 | 3/2001 | Hansen et al. |
| 6,215,928 | B1 | 4/2001 | Friesem et al. |
| 6,233,375 | B1 | 5/2001 | Lang et al. |
| 6,233,380 | B1 | 5/2001 | Ferrieu |
| 6,235,141 | B1 | 5/2001 | Feldman et al. |
| 6,240,109 | B1 | 5/2001 | Shieh |
| 6,251,297 | B1 | 6/2001 | Komuro et al. |
| 6,252,709 | B1 | 6/2001 | Sato |
| 6,253,009 | B1 | 6/2001 | Lestra et al. |
| 6,260,388 | B1 | 7/2001 | Borrelli et al. |
| 6,262,002 | B1 | 7/2001 | Carey |
| 6,263,002 | B1 | 7/2001 | Hsu et al. |
| 6,275,291 | B1 | 8/2001 | Abraham et al. |
| 6,285,810 | B1 | 9/2001 | Fincato et al. |
| 6,288,840 | B1 * | 9/2001 | Perkins et al. ............ 359/486 |
| 6,292,604 | B1 | 9/2001 | Cheng ..................... 385/24 |
| 6,309,580 | B1 | 10/2001 | Chou ...................... 264/338 |
| 6,317,554 | B1 | 11/2001 | Kosaka et al. |
| 6,324,192 | B1 | 11/2001 | Tayebati |
| 6,331,913 | B1 | 12/2001 | Huang et al. ............. 359/497 |
| 6,339,603 | B1 | 1/2002 | Flanders et al. |
| 6,349,103 | B1 | 2/2002 | Chung et al. |
| 6,353,623 | B1 | 3/2002 | Munks et al. |
| 6,359,915 | B1 | 3/2002 | Koch et al. |
| 6,370,177 | B1 | 4/2002 | Genei et al. |
| 6,371,662 | B1 | 4/2002 | Leard et al. |
| 6,374,016 | B2 | 4/2002 | Albert et al. |
| 6,400,860 | B1 | 6/2002 | Chandrasekhar et al. |
| 6,410,416 | B1 | 6/2002 | Dodabalapur et al. |
| 6,411,749 | B2 * | 6/2002 | Teng et al. ............... 385/11 |
| 6,482,742 | B1 | 11/2002 | Chou |
| 6,518,189 | B1 | 2/2003 | Chou |
| 6,618,104 | B1 | 9/2003 | Date et al. |
| 6,661,952 | B2 | 12/2003 | Simpson et al. |
| 6,692,797 | B1 | 2/2004 | Owen et al. |
| 6,713,238 | B1 | 3/2004 | Chou et al. |
| 2003/0007105 | A1 * | 1/2003 | Magarill et al. ........... 349/5 |
| 2003/0063832 | A1 * | 4/2003 | Hellman et al. ........... 385/11 |

OTHER PUBLICATIONS

Bird, G.R. et al., "The Wire Grid as a Near-Infrafed Polarizer," J. of the Optical Soc. of America, 50(9), 886–890, (1960).

Born, Max, and Wolf, Emil: Principles of Optics: Electromagnetic Theory of Propagation, Interference and Diffraction of Light 7th ed. Oct. 1, 1999. Cambridge University Press. p. 790.

Brundrett, D. L.., et al., "Normal–incidence guided–mode resonant grating filters: design and experimental demonstration" Optics Lett., May 1, 1998;23(9):700–702.

Cao, H., et al., "Fabrication of 10 nm enclosed nanofluidic channels," Appl. Phys. Lett. 81 (1), Jul. 1, 2002, pp. 174–176\.

Cao, H., et al., "Gradient Nanostructures for interfacing microfluidics and nanofluidics," Appl. Phys. Lett. 81 (16), Oct. 14, 2002, pp. 3058–3060.

Chang, Allan S. P., et al. "A new two–dimensional subwavelength resonant grating filter fabricated by nanoimprint lithography" Department of Electrical Engineering, Nano-Structures Laboratory, Princeton University.

Chigrin, D. N.,et al., "Observation of total omnidirectional reflection from a one–dimensional dielectric lattice" Appl. Phy. A. 1999;68:25–28.

Chou, S. Y., et al., "Subwavelength transmission gratings and their applications in VCSELs" Proc. SPIE. 1997;3290:73–81.

Chou, S. Y., et al., "Observation of Electron Velocity Overshoot in Sub–100–nm–channel MOSFET's in Silicon," IEEE Electron Device Letters, vol. EDL–6, No. 12, Dec. 1985, pp. 665–667.

Chou, S.Y., et al., "Imprint Lithography with 25–Nanometer Resolution" Apr. 5, 1996;272(5258):85–87.

Chou, S.Y., et al., "Sub–10 nm imprint lithography and applications" J. Vac. Sci. Technol. B. Nov./Dec. 1997;15(6):2897–2904.

Chou, S., et al., "Imprint of sub–25 nm vias and trenches in polymers," Appl. Phys., Lett. 67 (21), Nov. 20, 1995, pp. 3114–3116.

Chou, S., et al., "Lateral Resonant Tunneling Transistors Employing Field–Induced Quantum Wells and Barriers," Proceedings of the IEEE, vol. 79, No. 8, Aug. 1991, pp. 1131–1139.

Chou, S., et al., "Nanoscale Tera–Hertz Metal–Semiconductor–Metal Photodetectors," IEEE Journal of Quantum Electronics, vol. 28, No. 10, Oct. 1992, pp. 2358–2368.

Chou, S., et al., "Ultrafast and direct imprint of nanostructures in silicon," Nature, vol. 417, Jun. 20, 2002, pp. 835–837.

Chou, S., G.A., "Patterned Magnetic Nanostructures and Quantized Magnetic Disks," Proceedings of the IEEE, vol. 85, No. 4, Apr. 1997, pp. 652–671.

Cui, B.,et al., "Perpendicular quantized magnetic disks with 45 Gbits on a 4 x 2 $cm^2$ area," Journal of Applied Physics, vol. 85, No. 8, Apr. 15, 1999, pp. 5534–5536.

Deshpande, P., et al., "Lithographically induced self–assembly of microstructures with a liquid–filled gap between the mask and polymer surface," J. Vac. Sci. Technol. B 19(6), Nov./Dec. 2001, pp. 2741–2744.

Deshpande, P., et al., "Observation of dynamic behavior lithographically induced self–assembly of supromolecular periodic pillar arrays in a homopolymer film," Appl. Phys. Lett. 79(11), Sep. 10, 2001, pp. 1688–1690.

Fan, S., et al., "Design of three–dimensional photonic crystals at submicron lengthscales" Appl. Phys. Lett. Sep. 12, 1994;65(11)1466–1468.

Feiertag, G., et al., "Fabrication of photonic crystals by deep x–ray lithography" Appl. Phys. Lett., Sep. 15, 1997;71(11):1441–1443.

Fink, Y., et al., "Guiding optical light in air using an all–dielectric structure" J. Lightwave Techn. Nov. 1999;17(11):2039–2041.

Fink, Y., et al., "A dielectric omnidirectional reflector" Science. Nov. 27, 1998;282:1679–1682.

Fischer, P.B., et al., "10 nm electron beam lithography and sub–50 nm overlay using a modified scanning electron microscope," Appl. Phys. Lett. 62 (23), Jun. 7, 1993, pp. 2989–2991.

Flanders, D.C., "Submicrometer periodicity gratings as artificial anisotropic dielectrics," Appl. Phys. Lett. 42 (6), 492–494 (1983).

Gabathuler, W., et al., "Electro–nanomechanically wavelength–tunable integrated–optical bragg reflectors Part II: Stable device operation" Optics Communications. Jan. 1, 1998;145:258–264.

Gaylord, Thomas K., et al., "Analysis and applications of optical diffraction by gratings," Proc. IEEE. May 1985;73(5):894–937.

Goeman, S., et al., "First demonstration of highly reflective and highly polarization selective diffraction gratings (GIRO– Gratings) for long–wavelength VCSEL's" IEEE Photon. Technol. Lett. Sep. 1998;10(9):1205–1207.

Hayakawa, Tomokazu, et al, "ARROW–B Type Polarization Splitter with Asymmetric Y–Branch Fabricated by a Self–Alignment Process," J. Lightwave Techn, 15(7),1165–1170, (1997).

Hereth, R., et al, "Broad–band optical directional couplers and polarization splitter," J. Lightwave Techn., 7(6), 925–930, (1989).

Ho, K.M., et al.,"Existance of a photonic gap in periodic dielectric structures" Dec. 17, 1990;65(25):3152–3155.

Ibanescu, M., et al., "An all–dielectric coaxial waveguide" Science. Jul. 21, 2000;289:415–419.

Joannopoulos, J.D., et al., "Photonic crystals: putting a new twist on light" Nature. Mar. 13, 1997(6621):143–149.

Kokubun, Y., et al, "ARROW–Type Polarizer Utilizing Form Birefringence in Multilayer First Cladding," IEEE Photon. Techn. Lett., 11(9), 1418–1420, (1993).

Kuksenkov, D. V., et al., "Polarization related properties of vertical–cavity surface–emitting lasers" IEEE J. of Selected Topics in Quantum Electronics. Apr. 1997;3(2):390–395.

Levi, B.G., "Visible progress made in three–dimensional photonic 'crystals'" Physics Today. Jan. 1999;52(1):17–19.

Li, M., et al., "Direct three–dimensional patterning using nanoimprint lithography," Appl. Phys. Lett. 78 (21), May 21, 2001, pp. 3322–3324.

Li, M., et al., "Fabrication of circular optical structures with a 20 nm minimum feature using nanoimprint lithography." Appl. Phys. Lett. 76 (6), Feb. 7, 2000, pp. 673–675.

Magel, G.A., "Integrated optic devices using micromachined metal membranes" SPIE. Jan. 1996;2686:54–63.

Magnusson, R., et al., "New principle for optical filters" Appl. Phys. Lett. Aug. 31, 1992;61(9):1022–1023.

Mashev, L., et al., "Zero order anomaly of dielectric coated gratings" Optics Communications. Oct. 15, 1985; 55(6):377–380.

Moharam, M. G., et al., "Rigorous coupled–wave analysis of planar–grating diffraction" J. Opt. Soc. Am. Jul. 1981;71(7):811–818.

Mukaihara, T., et al., "Engineered polarization control of GaAs/AlGaAs surface emitting lasers by anisotropic stress from elliptical etched substrate hole" IEEE Photon. Technol. Lett. Feb. 1993;5(2):133–135.

Noda, S., et al., "New realization method for three–dimensional photonic crystal in optical wavelength region" Jpn. J. Appl. Phys. Jul. 15, 1996;35:L909–L912.

Oh, M., et al., "Polymeric waveguide polarization splitter with a buried birefringent polymer" IEEE Photon. Techn. Lett. Sep. 1999;11(9):1144–1146.

Painter, O., et al., "Lithographic tuning of a two–dimensional photonic crystal laser array" IEEE Photon. Techn. Lett., Sep. 2000;12(9):1126–1128.

Painter, O., et al., "Room temperature photonic crystal defect lasers at near–infrared wavelengths in InGaAsP" J. Lightwave Techn., Nov. 1999.;17(11):2082–2088.

Peng, S., et al., "Experimental demonstration of resonant anomalies in diffraction from two–dimensional gratings" Optics Lett. Apr. 15, 1996;21(8):549–551.

Ripin, D. J., et al., "One–dimensional photonic bandgap microcavities for strong optical confinement in GaAs and GaAs/AlxOy semiconductor waveguides" J. Lightwave Techn. Nov. 1999;17(11):2152–2160.

Rokhinson, L.P., et al., "Double–dot charge transport in Si single–electron/hole transistors," Appl. Phys. Lett. 76 (12), Mar. 20, 2000, pp. 1591–1593.

Rokhinson, L.P., et al., "Kondo–like zero–bias anomaly in electronic transport through an ultrasmall Si quantum dot," Physical Review B, vol. 60, No. 24, Dec. 15, 1999, pp. 319–321.

Rokhinson, L.P., et al., "Magnetically Induced Reconstruction of the Ground State in a Few–Electron Si Quantum Dot," Physical Review Letters, vol. 87, No. 16, Oct. 15, 2001, pp. 1–3.

Rudin, A., et al., "Charge–ring model for the charge–induced confinement enhancement in stacked quantum–dot transistors," Appl. Phys. Lett. 73 (23), Dec. 7, 1998, pp. 3429–3431.

Russell, P. St. J., et al., "Full photonic bandgaps and spontaneous emission control in 1D multilayer dielectric structures" Opt. Commun. Feb. 1, 1999;160:66–71.

Rytov, S. M., "Electromagnetic properties of a finely stratified medium" Soviet Physics JETP (Journal of Experimental & Theoretical Physics). May 1956;2(1):466–475.

Schablitksy, S., et al., "Controlling polarization of vertical–cavity surface–emitting lasers using amorphous silicon subwavelength transmission gratings," Appl. Phys. Lett. 69 (1), Jul. 1, 1996, pp. 7–9.

Sharon, A., et al., "Narrow spectral bandwidths with grating waveguides structures" Appl.Phys.Lett. Dec. 30, 1996;69(27):4154–4156.

Sugimoto, Y., et al., "Experimental verification of guided modes in 60 degrees –bent defect waveguides in AlGaAs–based air–bridge–type two–dimensional photonic crystal slabs" J. Appl. Phys. Mar. 1, 2002;91(5):3477–3479.

Sun, X., et al., "Multilayer resist methods for nanoimprint lithography on nonflat surfaces" J. Vac. Sci. Technol. B. Nov./Dec. 1998;16(6)3922–3925.

Tibuleac, S., et al., "Reflection and transmission guided–mode resonance filters" J. Opt. Soc. Am. A. Jul. 1997;14(7):1617–1626.

Trutschel, U., et al, "Polarization splitter based on anti–resonant reflecting optical waveguides," J Lightwave Techn., 13(2), 239–243, (1995).

Tyan, R.C., et al., "Design, fabrication and characterization of form–birefringent multilayer polarizing beam splitter" J. Opt. Soc. Am. A. Jul. 1997;14(7):1627–1636.

Tyan, R. et al., "Polarizing beam splitters constructed of form–birefringent multilayer gratings," SPIE 2689, 82–89.

van Blaaderenm, Alfons, "Opals in a New Light" Science. Oct. 30, 1998;282(5390):887–888.

van Doorn, A. K. Jansen, et al., "Strain–induced birefringence in vertical–cavity semiconductor lasers" IEEE J. Quantum Electronics. Apr. 1998;34(4):700–706.

Vellekoop, A.R. et al, "A small–size polarization splitter based on a planar phase optical phased array," J Lightwave Techn., 8(1), 118–124, (1990).

Wang, J., et al., "Molecular alignment in submicron patterned polymer matrix using nano–imprint lithography," Appl. Phys. Lett. 77 (2), Jul. 10, 2000, pp. 166–168.

Wang, J., et al., "Fabrication of a new broadband waveguide polarizer with a double–layer 190 nm period metal–gratings using nanoimprint lithography" J. Vac. Sci. Technol. B. Nov./Dec. 1999;17(6):2957–2960.

Wang, S. S., et al., "Design of waveguide–grating filters with symmetrical line shapes and low sidebands" Opt. Lett. Jun. 15, 1994;19(12):919–921.

Wang, S. S., et al., "Guided–mode resonances in planar dielectric–layer diffraction gratings" J. Opt. Soc. Am. A. Aug. 1990;7(8):1470–1475.

Weber, M. F., Stover, C.A., Gilbert, L.R., Nevitt, T.J., Ouderkirk, A.J. "Giant birefringent optics in multilayer polymer mirrors," Science, 287, 2451–2456, Mar. 31, 2000.

Winn, J. N., et al., "Omnidirectional reflection from a one–dimensional photonic crystal" Opt. Lett. Oct. 15, 1998;23(20):1573–1575.

Wu, L., et al., "Dynamic modeling and scaling of nanostructure formation in the lithographically induced self–assembly and self–construction" Appl. Phys. Lett. May 12, 2003;82(19):3200–3202.

Yablonovitch, E., "Inhibited spontaneous emission in solid–state physics and electronics" Phys. Rev. Lett. May 18, 1987;58(20):2059–2062.

Yablonovitch, E., et al., "Photonic band structure: The face–centered–cubic case employing nonspherical atoms" Phys. Rev. Lett. Oct. 21, 1991;67(17):2295–2298.

Yanagawa, H., et al, "High extinction guided–wave optical polarization splitter," IEEE Photon. Techn. Lett., 3(1), 17–18, (1991).

Yoshikawa, T., et al., "Polarization–controlled single–mode VCSEL" IEEE J. Quantum Electronics. Jun. 1998;34(6):1009–1015.

Yu, Z., et al., "Reflective polarizer based on a stacked double–layer subwavelength metal grating structure fabricated using nanoimprint lithography," Appl. Phys. Lett. 77 (7), Aug. 14, 2000, pp. 927–929.

Zakhidov, A.A., et al., "Carbon structures with three–dimensional periodicity at optical wavelengths" Science. Oct. 30, 1998;282(5390):897–901.

* cited by examiner

OPTICAL POLARIZATION BEAM COMBINER/SPLITTER

FIELD OF THE INVENTION

The present invention generally relates to optical polarization beam combiners/splitters and more particularly to packaged fiber-optic polarization beam combiners/splitters that utilize a thin film wire-grid polarizer.

BACKGROUND OF THE INVENTION

Optical polarization beam combiners/splitters are used in many optical communications applications including those that require amplification of optical signals, preferred distribution of the polarization states, a combination of both, or separation of beam polarizations.

FIGS. 1a and 1b illustrate an example of a prior art optical polarization beam combiner/splitter ("PBC/S") device that utilizes a polarization beam splitter cube 7. In the optical polarization beam splitter of FIG. 1a, an incident beam enters from a first source, such as optical fiber 1 located at the left side of the figure. The incoming beam from the first optical fiber 1 is collimated by a first collimating/focusing lens 4, and then enters the polarization beam splitter cube 7. The polarization beam splitter cube 7 is able to split an arbitrarily polarized light beam into two separated beams with orthogonally polarized directions. A first of the split beams exits to the right and is focused, for example, into a second optical fiber 2 through a second collimating/focusing lens 5. A second of the split beams exits in an upward direction and is focused, for example, into a third optical fiber 3 through a third collimating/focusing lens 6.

In the optical polarization beam combiner of FIG. 1b, the propagation direction of the beams are reversed from those in FIG. 1a so that second and third optical fibers 2' and 3' are now the beam input fibers and they carry polarized beams whose polarization states are well defined and orthogonal to each other. Also, because the second and third optical fibers 2' and 3' must carry polarized incident beams of defined polarization states, they must be polarization-maintaining fibers. The two incident beams are combined by the polarization beam splitter cube 7' and exit through the first optical fiber 1'. The prior art device depicted in FIGS. 1a and 1b, have several drawbacks, such as a large overall device size necessitated by the need to employ orthogonally disposed beams, and a low extinction ratio, which is a characteristic of polarization beam splitter cubes.

A second prior art optical PBC/S device is illustrated in FIGS. 2a and 2b where a birefringent crystal 17 is the polarizer providing the beam combining and splitting function. In the optical polarization beam splitter of FIG. 2a, an incoming arbitrarily polarized light from a first source, such as, optical fiber 11, is focused by a first collimating/focusing lens 14 and then split into two beams having orthogonal polarizations. Each of the polarized beams is focused, for example, by second and third collimating/focusing lenses 15 and 16 into second and third optical fibers 12 and 13 respectively.

In the optical polarization beam combiner of FIG. 2b, two polarized incident beams are carried by second and third optical fibers 12' and 13'. The two polarized incident beams must have orthogonal polarization states and they are focused onto the birefringent crystal 17' by the second and third collimating/focusing lenses 15' and 16', respectively. The birefringent crystal 17' combines the two incident beams into one output beam which is focused by the first collimating/focusing lens 14' into the first optical fiber 11'.

But, the device of FIGS. 2a and 2b tends to be bulky. Because the second and third optical fibers 12 and 13 are on the same side of the birefringent crystal 17, the birefringent crystal 17 must have a length sufficient to separate the two beams enough to accommodate the lenses 15 and 16. Typically, lenses for such application have diameters of around 1.8 mm, requiring a minimum of 1.8 mm separation between the two beams. This requires a birefringent crystal of about 18 mm in length. Another drawback of an optical PBC/S device employing a birefringent crystal is the relatively narrow range of incident angles the birefringent crystal can accommodate.

FIG. 3 illustrates another prior art optical polarization beam combiner where a Wollaston prism 30 is disposed between collimating/focusing lenses 24 and 25. The Wollaston prism 30 is the polarizer that provides the beam splitting and combining function. As in the prior art device depicted in FIGS. 2a and 2b, second and third optical fibers 22 and 23 are on the same side of the polarizing filter. An arbitrarily polarized incident beam from first source, such as optical fiber 21, is split into component beams 27 and 28 by the Wollaston prism 30 and focused into the second and third optical fibers 22 and 23. The first optical fiber 21 defines an optical axis 29 of the device and the lenses 24 and 25, the Wollaston prism 30, and the second and third optical fibers 22 and 23 are all aligned so that the component beams 27 and 28 leave the Wollaston prism 30 at angles symmetrical about the optical axis 29. As a result, lens 25 focuses the component beams 27 and 28 into the optical fibers 22 and 23, respectively, disposed symmetrically about optical axis 29.

By providing polarization-maintaining optical fibers for the second and third optical fibers 22 and 23, the prior art device of FIG. 3 can also be used as a polarization beam combiner that combines two orthogonally oriented polarized beams delivered via the second and the third optical fibers 22 and 23 into one composite output beam.

Another prior art optical PBC/S device utilizes prisms in a combination with a dielectric thin film. Such designs tend to be bulky, resulting in higher insertion loss. Another drawback for this type of device is the need for a matching index coating for the dielectric film. This is often implemented with an organic compound, which limits the overall power that the device can handle.

Yet another prior art optical polarization beam combiner is a fused fiber wave guide. Fused fiber wave guides offer overall lowest insertion loss, but in most designs the two channels have different insertion losses and it is not easy to match them. Another distinct drawback for the fused fiber wave guide polarization beam combiner is the very narrow wavelength range of operation. Typically the range is a few nanometers and increasing the device bandwidth will result in increased insertion loss.

Thus, there is a need for an optical PBC/S device that is compact, has relatively wide wavelength range of operation, is capable of handling high power beams, and is capable of handling more than one set of input/output beams with one set of collimating optical elements.

SUMMARY OF THE INVENTION

The present invention provides a compact optical PBC/S device employing a subwavelength wire grid polarizing element that can be packaged into a highly integrated optical module. More particularly, a compact optical PBC/S device employing a thin film wire-grid polarizer is provided.

In an embodiment where the optical device is a beam combiner, the optical PBC/S device comprises a first optical beam carrier, such as an optical fiber, that carries a first polarized incident beam, a second optical beam carrier that carries a second polarized incident beam polarized in an orthogonal orientation to the first polarized incident beam, and a third optical beam carrier that carries the device's depolarized output beam which is the composite of the first and the second polarized incident beams. As generally known in the art, the first and second optical beam carriers must be able to maintain the polarization of the incident beams to ensure that one of the incident beams has S polarization state and the other incident beam as P polarization state. Polarization-maintaining optical fibers are examples of such optical beam carriers. The third optical beam carrier can be a standard optical fiber since it carries the composite depolarized output beam.

Two collimating/focusing lenses, each lenses having an inwardly-facing surface, an outwardly-facing surface, and an optical axis are oriented coaxially so that their optical axes align collinearly, defining the device's optical axis, and their inwardly-facing surfaces face each other. These two collimating/focusing lenses are positioned between the first and second optical beam carriers and the optical beam carriers are oriented so that the beams exiting or entering the beam carriers propagate parallel to the optical axis of the optical PBC/S device. For example, where the optical beam carriers are optical fibers, the optical fibers are configured so that their optical axes are parallel to the optical axis of the optical PBC/S device. The third optical beam carrier for carrying the composite output beam is positioned on the same side of the two collimating/focusing lenses as the first optical beam carrier and also oriented so that the beam exiting or entering the beam carrier propagate parallel to the optical axis of the optical PBC/S device.

Between the two collimating/focusing lenses is a thin film wire-grid polarizer that provides the beam combining/splitting functions. When the two polarized incident beams are collimated through the collimating/focusing lenses and encounters the thin film wire-grid polarizer, for a certain orientation of the wire grids with respect to the incoming polarizations, the S polarized incident beam will be reflected by the polarizer and the P polarized incident beam will transmit through the polarizer. The reflected S polarized beam and the transmitted P polarized beam combine into a composite depolarized output beam and exits through the third optical beam carrier. If the thin film wire-grid polarizer's orientation is rotated by 90 degrees, the P polarized light will be reflected and the S polarized light will be transmitted instead.

In a typical application of this optical beam combiner embodiment, two incident beams of S and P polarizations are received into the device by the first and second optical beam carriers. If the S and P polarized incident beams are received by the first and second optical beam carriers respectively, the thin film wire-grid polarizer is appropriately oriented so that the S polarized incident beam is reflected by the thin film wire-grid polarizer and directed towards the third optical beam carrier. The P polarized incident beam, on the other hand, is transmitted through the thin film wire-grid polarizer and also directed towards the third optical beam carrier so that the transmitted beam combines with the reflected S polarized beam to form a composite output beam.

In another embodiment of the optical beam combiner of the present invention, the optical PBC/S device is provided with a fourth optical beam carrier positioned on the same side of the two collimating/focusing lenses as the second optical beam carrier. The fourth optical beam carrier is positioned at a location that is the mirror image of the third optical beam carrier with respect to the plane defined by the thin film wire-grid polarizer. In this embodiment, the combined depolarized output beam can be directed to either the third optical beam carrier or the fourth optical beam carrier, as desired, by changing the orientation of the thin film wire-grid polarizer between two positions to control which of the two S and P polarized incident beams are reflected and transmitted. According to the generally known principles of optics involved with wire-grid polarizers, the two positions of the thin film wire-grid polarizer involved here differ by 90 degrees rotation of the thin film wire-grid polarizer about the optical axis of the optical PBC/S device. Furthermore, the composite depolarized output beam can be controllably apportioned between the third and the fourth optical beam carriers by positioning the thin film wire-grid polarizer between the two positions discussed above.

In addition, the optical PBC/S device of the present invention can be used as a polarization beam splitter rather than a beam combiner by reversing the propagation direction of the light beams. In this application, an incident beam of arbitrary polarization is inputted into the third optical beam carrier and is decomposed into two beams of orthogonal polarization by the thin film wire-grid polarizer. The two output beams are then guided through the first and second optical beam carriers.

The use of a thin film wire-grid polarizer, a very thin optical element, enables the overall optical device to be compact and simpler than the prior art optical PBC/S devices. This simplified design will provide reduced insertion loss through the device, smaller footprint, simpler assembly, improved manufacturing yields, and thus reduced overall optical packaging cost.

Furthermore, the optical PBC/S device of the present invention also provides better optical performance over the prior art optical PBC/S because of the superior performance characteristics of thin film wire-grid polarizers. Thin film wire-grid polarizers provide among other benefits, a broader wavelength range of operation and broader range of incidence angles.

The thin film wire-grid polarizer is typically formed as a discrete device by fabricating thin film wire grid structures on an optically transparent substrate material, such as $SiO_2$. But if desired, the thin film wire grid structures can be fabricated directly on the inwardly-facing surface of one of the collimating/focusing lenses, further integrating the optical PBC/S device. The thin film wire grid structures on the polarizer may preferably have nano-scale dimensions and thus allow very finely spaced subwavelength wire grids for use in high frequency applications such as combining or splitting beams in infrared, visible, or UV light range.

BRIEF DESCRIPTION OF THE DRAWINGS

For a better understanding of the invention, reference should be made to the following detailed description taken in conjunction with the accompanying drawings in which like elements are numbered similarly and in which.

The drawings are only schematic and are not to scale.

DETAILED DESCRIPTION OF THE INVENTION

The following detailed description of the present invention is for illustrative purposes and should not be construed to limit the invention to these examples.

Figure 1A:
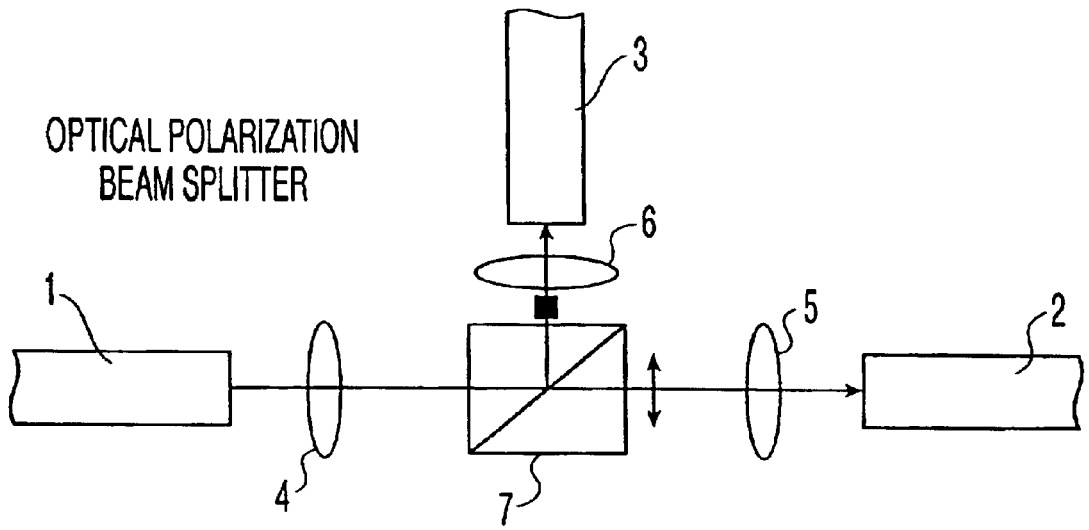
FIGS. 1a and 1b illustrate an example of a prior art optical PBC/S device.
Figure 1B:
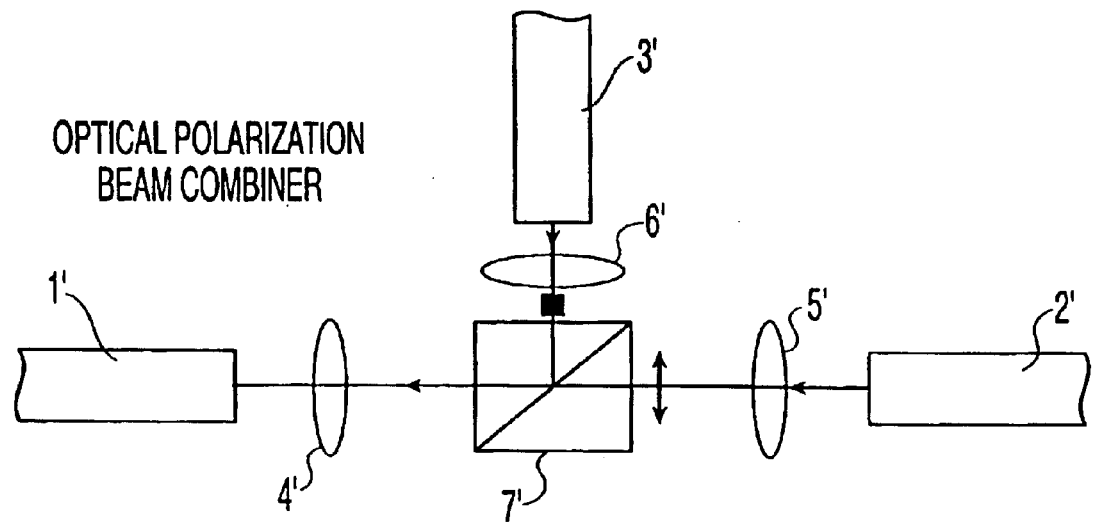
Figure 2A:
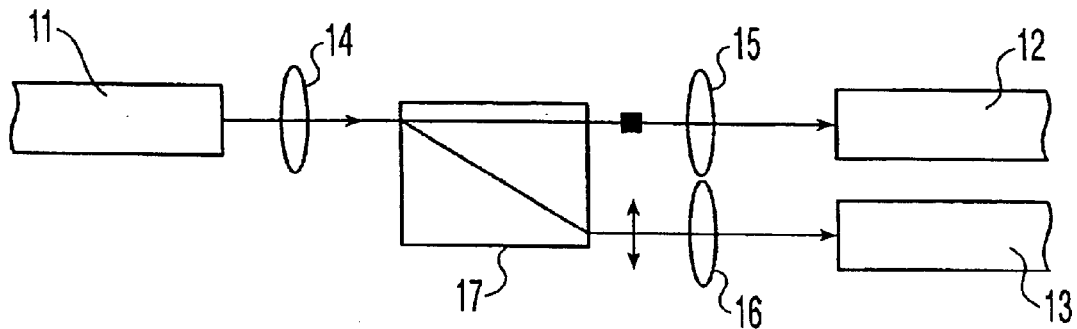
FIGS. 2a and 2b illustrate a second example of a prior art optical PBC/S device.
Figure 2B:
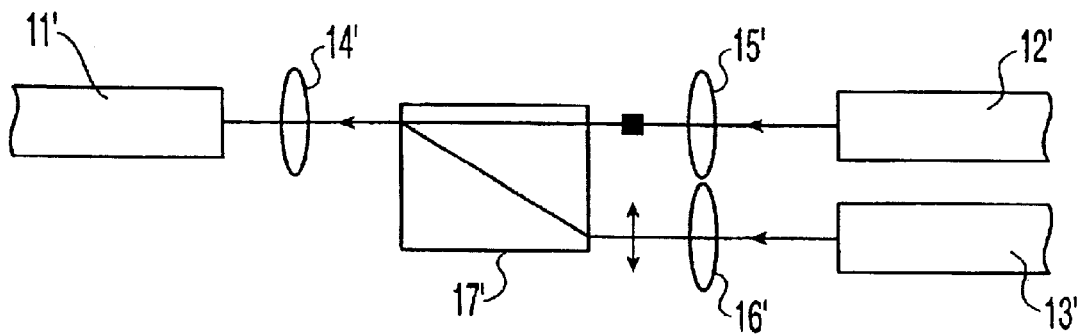
Figure 3:
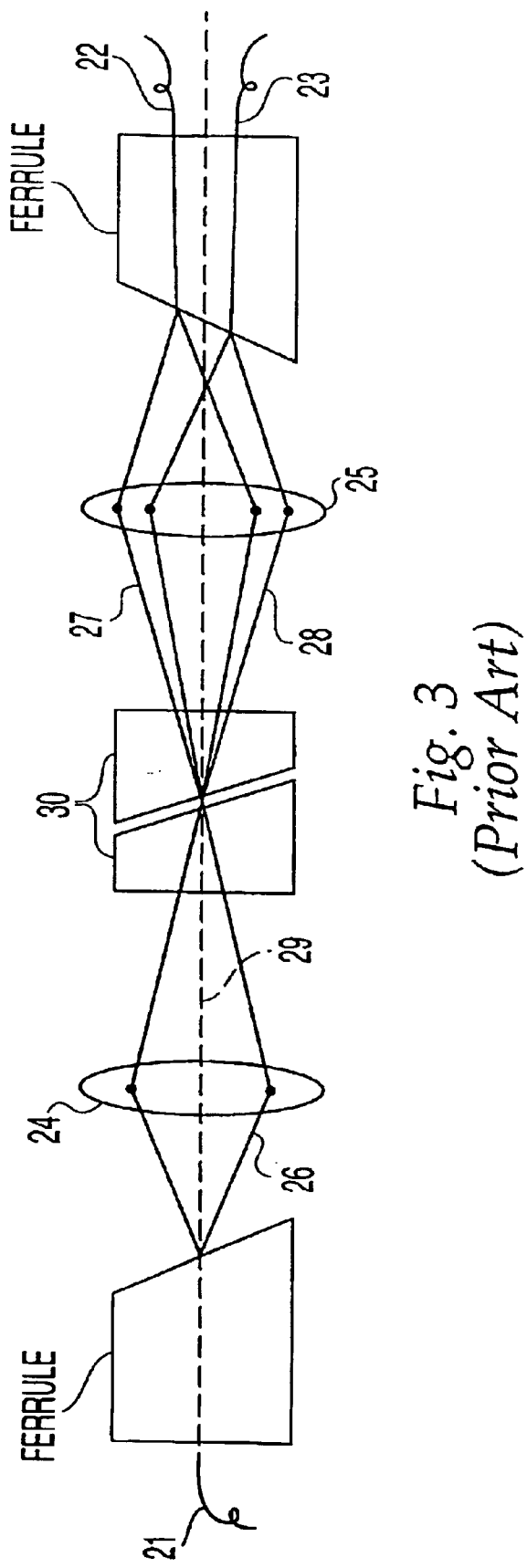
FIG. 3 illustrates another example of a prior art optical PBC/S device.
Figure 4:
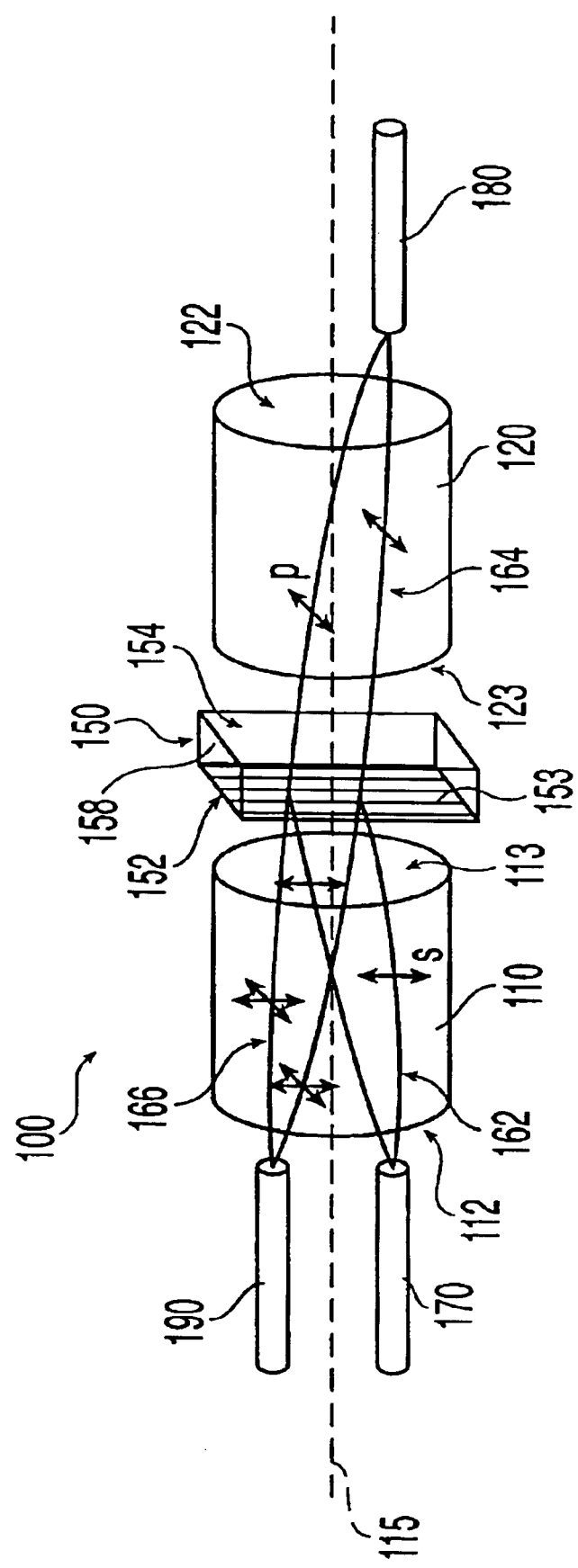
FIG. 4 illustrates a perspective schematic view of an embodiment of an optical PBC/S device incorporating a thin film wire-grid polarizer according to the present invention.

FIG. 4 illustrates a perspective view of an optical PBC/S device 100 according to an embodiment of the present invention. The optical PBC/S device according to the present invention operates equally well as a polarization beam combiner and a polarization beam splitter. The optical PBC/S device 100 will be first described in the context of its beam combining operational mode. The device 100 comprises a thin film wire-grid polarizer 150 provided between a pair of collimating/focusing lenses 110 and 120. The thin film wire-grid polarizer 150 is illustrated in this example as comprising thin film wire grid structures 153 deposited on a substrate material 158.

Graded index lenses can be used for the collimating/focusing lenses 110 and 120. The collimating/focusing lenses 110 and 120 are provided in a coaxial configuration so that their optical axes align to define the optical PBC/S device's optical axis 115. In this configuration, the graded index lenses' inwardly-facing surfaces 113 and 123 face each other and their outwardly-facing surfaces 112 and 122 face away from each other. On the outwardly-facing surface 112 side of the graded index lens 110 are two optical fibers oriented parallel to the device's optical axis 115: a first input fiber 170 and an output fiber 190. On the outwardly-facing surface 122 side of the collimating/focusing lens 120 is a second input fiber 180. For the optical PBC/S device 100 to be used as a beam combiner, the first and second input fibers 170 and 180 must be polarization-maintaining fibers.

Figure 5:
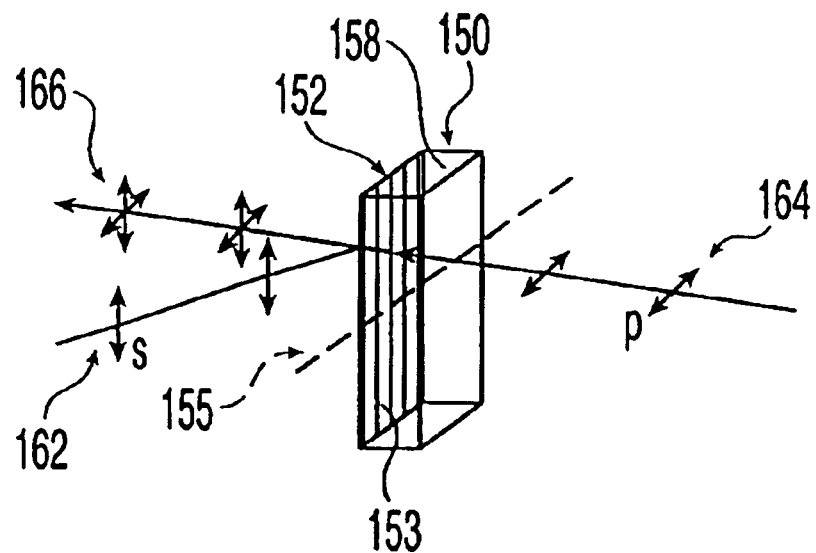
FIG. 5 is an isolated view of the thin film wire-grid polarizer of FIG. 4.
Figure 6:
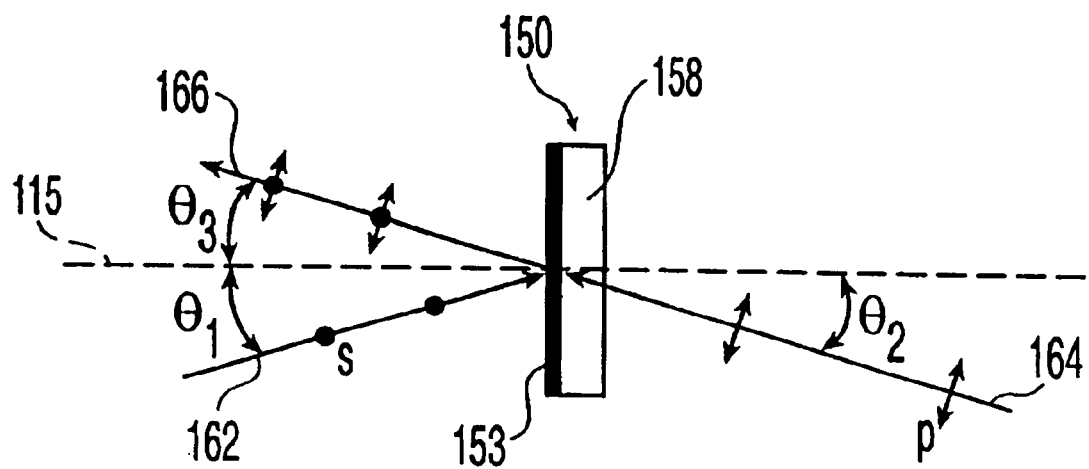
FIG. 6 is a top-down view of the thin film wire-grid polarizer of FIG. 5 illustrating the incidence angles of incident beams in a beam combiner application.

FIGS. 5 and 6 illustrate the beam combining/splitting properties of the thin film wire-grid polarizer 150 of the optical PBC/S device 100 illustrated in FIG. 4. The thin film wire grid structures 153 deposited on one side of an optically transparent substrate 158 form an active area that combines or splits the beams. The substrate 158 is made of a glass or any material that will transmit the particular wavelengths of the beams involved. The thin film wire grid structures 153 will always reflect a beam of polarization parallel to the wire grids and transmit a beam of polarization orthogonal to the wire grids. Light with polarization parallel to the wire grids excites electron oscillations in the wire grids. The oscillating electrons radiate coherently and the combined electromagnetic field from the oscillating electrons forms the reflected beam. Both incoming and reflected beams in that polarization obey the laws for reflection from a solid metal surface.

If the incident beam is of polarization perpendicular to the wire grids direction and the wire grids are sufficiently thin to not allow the incoming electromagnetic field of the incident beam to excite the electron oscillations, the incident beam will be transmitted through the wire grids without any alteration. For this polarization the wire grid acts like a dielectric. Therefore, the transmission optical axis 155 for the wire-grid structure 153 is perpendicular to the direction of the wire grids.

For purposes of illustration, first and second polarized incident beams 162, 164 and a composite depolarized output beam 166 are depicted as collimated single beams. In this embodiment, the optical transmission axis 155 of the thin film wire-grid structure 153 is oriented in such a way as to reflect the first polarized incident beam 162 from the first input fiber 170. In other words, the slow axis of the first input fiber 170, designated as S in FIG. 5, is set to be orthogonal to the optical transmission axis 155 of the thin film wire grid structure 153. On the other hand, the slow axis of the second polarization maintaining input fiber 180, designated as P in FIG. 5, is set to be parallel to the optical transmission axis 155 so that the second polarized incident beam 164, whose polarization state is orthogonal to that of the first polarized incident beam 162 transmits through the thin film wire-grid polarizer 150. As a result, the reflected incident beam 162 and the transmitted incident beam 164 combine to form a composite depolarized output beam 166 having both polarization states.

FIG. 6 is a top view of the thin film wire-grid polarizer 150 illustrating the angular relationship of the incident and the output beams to the optical axis 115 of the optical PBC/S device 100. In this embodiment, the plane defined by the thin film wire-grid polarizer 150 is orthogonal to the optical axis 115. The first polarized incident beam 162 having the S polarization state is reflected by the thin film wire-grid structure 153 so the incident angle θ1 and the reflected angle θ3 with respect to the optical axis 115 are equal. The second polarized incident beam 164 having the P polarization state transmits through the thin film wire-grid polarizer's substrate material 158 and the thin film wire grid structures 153 and continues. By setting the second incident beam's incident angle θ2 equal to the first incident beam's incident angle θ1, the transmitted second incident beam will exit the thin film wire-grid structures 153 at the angle θ3 and combine with the reflected first polarized incident beam 162 to form the composite depolarized output beam 166. It is a typical feature of a thin film wire-grid polarizer that it can operate and maintain peak performance in a wide range of incidence angles.

Because the thin film wire-grid structure 153 is provided on one side of the substrate material 158, the wire-grid structure is not truly symmetrically positioned between the two collimating/focusing lenses 110 and 120. But, because the thin film wire-grid polarizers can be fabricated on very thin, typically less than 0.5 mm thick, any aberration that may be introduced by the substrate material 158 can be significantly minimized.

As with any metal grid polarizer, it is generally known in the art that a thin film wire grid's ability to reflect or transmit a beam of a given wavelength is dependent on the wire grid's dimensions and the choice of materials for the substrate. One can optimize the transmittance and reflectance of a wire grid polarizer by selecting appropriate grid dimensions and the materials for a given application.

Subwavelength thin film wire-grid polarizers that will optimally operate in infrared to UV range should have nano-scale structures, i.e. structures having nanometer dimensions. For example, for an optimal operation in the infrared light range, the thin film wire grid's period is preferably between 150 nm-250 nm with a fill ratio for the metal grating between 20–40%. For an optimal operation in the visible light range, the thin film wire grid's period is preferably on the order of 150 nm or less with a fill ratio of 50% or less. An example of a such wire grid polarizer optimized for visible light application is described in U.S. Pat. No. 6,288,840.

Fabrication of subwavelength thin film wire-grid polarizers per se is generally known and need not be discussed in detail here. The material selection for the metal grid as well as the substrate material for the metal grid is also an important consideration. Appropriate material should be selected to minimize the absorption at the particular wavelength of operation. For example, in the UV range, most optical materials absorb a lot of light so one may need to fabricate the thin film wire grid structures on a low UV absorbing material such as fused silica. But it will be appreciated by one of ordinary skill in the art that by taking the above factors into consideration a thin film wire-grid polarizer can be optimized for operation in the infrared to the UV range.

Figure 7:
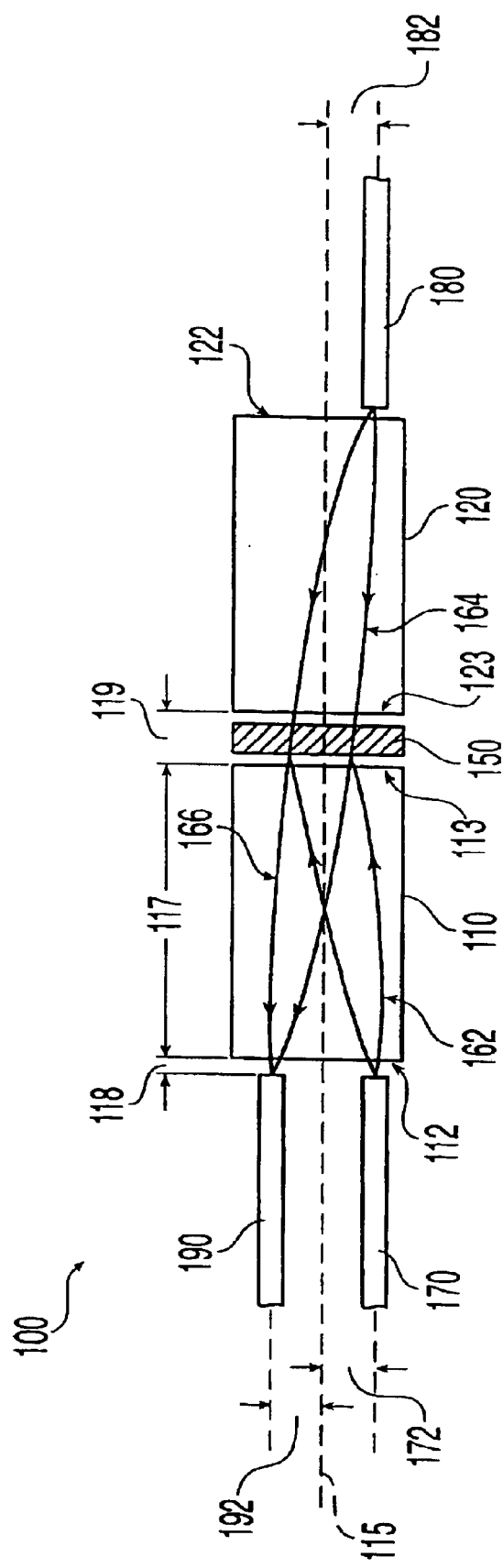
FIG. 7 is a side view of the device of FIG. 4 with the direction of beams illustrating the device in a beam combiner application.

FIG. 7 is a cross-sectional illustration of the optical PBC/S device 100 and the operation of the device as a beam combiner will be described using the illustration. In a beam combining operational mode, two polarized incident beams 162 and 164, each having a polarization state orthogonal to the polarization state of the other beam, are inputted by the two input fibers 170 and 180, respectively. As mentioned above, these input fibers must be polarization-maintaining fibers. The first polarized incident beam 162 from the first input fiber 170 is collimated through the collimating/focusing lens 110 and exits at the inwardly-facing surface 113 of the collimating/focusing lens 110. As discussed above in reference to FIGS. 5 and 6, the first input fiber 170 must be oriented so that the optical fiber's slow axis is orthogonal to the transmission optical axis 155 of the thin film wire-grid polarizer 150. The resulting first polarized incident beam 162 is reflected by the thin film wire-grid polarizer 150 and reenters the collimating/focusing lens 110 and is focused into the output fiber 190.

The second polarized incident beam 164 from the second polarization-maintaining optical fiber 180 is collimated through the collimating/focusing lens 120 and exits at the inwardly-facing surface 123 of the collimating/focusing lens 120. The second polarized incident beam 164 then propagates through the collimating/focusing lens 120 and the thin film wire-grid polarizer 150 and couple with the reflected first polarized incident beam 162 to form the composite depolarized output beam 166. But as discussed above in reference to FIGS. 5 and 6, in order for the second polarized incident beam 164 to transmit through the thin film wire-grid polarizer 150, the second input fiber 180 must be oriented so that the optical fiber's slow axis is parallel to the transmission optical axis 155 of the thin film wire-grid polarizer 150.

As discussed in reference to FIG. 6, in order for the two polarized incident beams 162 and 164 to properly couple and form the composite depolarized output beam 166, the input fibers 170 and 180 must be located so that first and second incident beams 162 and 164 have equal incident angles $\theta 1$ and $\theta 2$ and the incident beams 162 and 164 meet at the same position on the thin film wire grid structures 153.

The incident angles $\theta 1$ and $\theta 2$ are determined by the exit angles of the incident beams 162 and 164 at the inwardly-facing surfaces 113 and 123 of the collimating/focusing lenses 110 and 120, respectively. Because the collimating/focusing lenses 110 and 120 are graded index lenses, the exit angles are determined by the offset distances 172 and 182 of the input fibers 170 and 180 from the optical axis 115 of the collimating/focusing lenses 110 and 120, respectively. The greater the offset distance, the greater the exit angle will be and the incident angles $\theta 1$ and $\theta 2$ will be increased accordingly. Hence, for a proper alignment between the input fiber 170 and the output fiber 190, if the offset distance 172 is set high for the input fiber 170, the offset distance 192 for the output fiber 190 must be correspondingly set to the same high value since the resulting incident angle $\theta 1$ of the incident beam 162 and the reflected angle $\theta 3$ of the reflected output beam 166 will be large. Then the symmetry in the arrangement requires that the offset distance 182, of the second input fiber 180, also should be set to match the offset distance 172 also so that the incident angle $\theta 2$ of the second incident beam 164 will be appropriately adjusted for a proper coupling of the two incident beams 162 and 164 at the thin film wire-grid polarizer 150.

Persons of ordinary skill in the art will appreciate that by switching the input/output roles of the optical fibers 170, 180, and 190, and reversing the propagation directions of the beams involved, the same configuration of optical PBC/S device 100 functions as a beam splitter.

Figure 8:
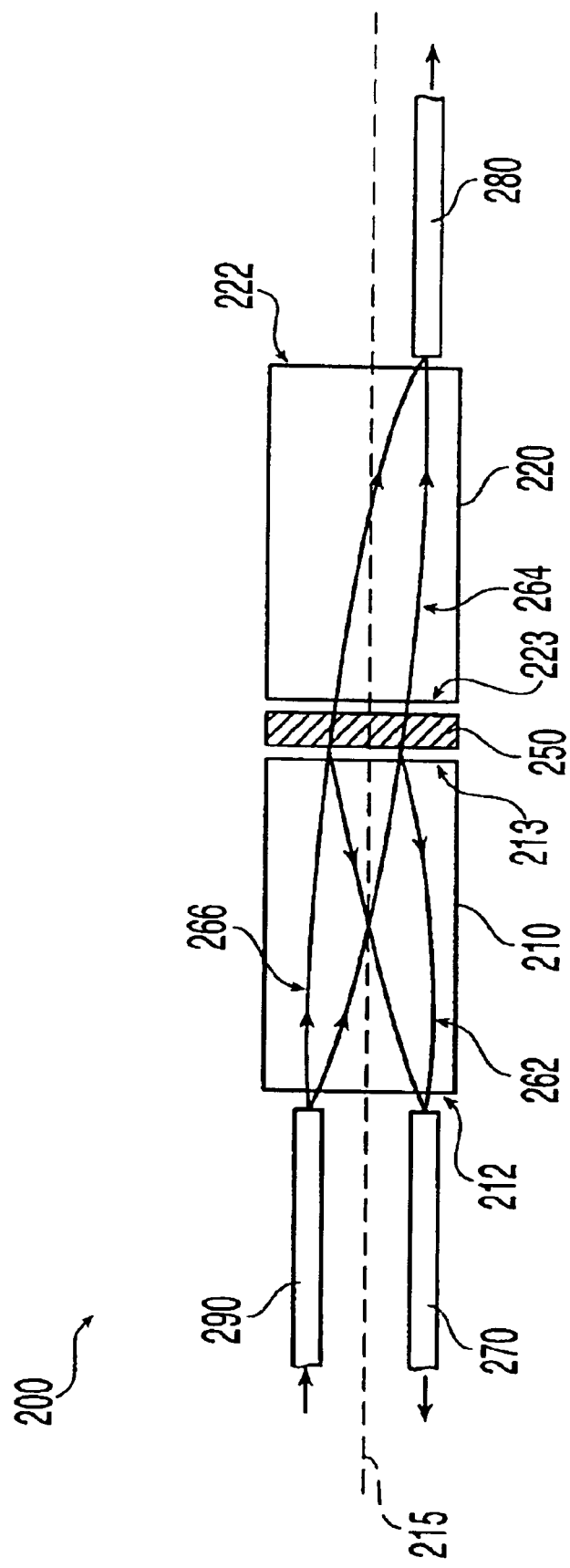
FIGS. 8 illustrates a side view of another embodiment of the device of FIG. 4 with the direction of beams illustrating the device in a beam splitter application.

FIG. 8 illustrates such an optical PBC/S device 200 depicting the propagation direction of the input and output beams involved in the beam splitter mode of operation. An incident beam 266 of arbitrary polarization is delivered through an input fiber 290. The incident beam 266 is collimated through a first collimating/focusing lens 210 and exits at inwardly-facing surface 213 of the first collimating/focusing lens 210. When the incident beam 266 encounters thin film wire-grid polarizer 250, according to the optical principles described in reference to FIGS. 5 and 6, a component of the incident beam 266 having the S polarization state is reflected by the thin film wire-grid polarizer 250 as an output beam 262. This polarized output beam 262 propagates through the first collimating/focusing lens 210 and is focused into a first output fiber 270 that is appropriately positioned with respect to the optical axis 215 to be in alignment with the focused output beam 262. A component of the incident beam 266 having the P polarization state is transmitted through the thin film wire-grid polarizer 250 as an output beam 264. This polarized output beam 264 propagates through a second collimating/focusing lens 220 and focused into an output fiber 280 that is appropriately positioned with respect to the optical axis 215 to be in alignment with the focused output beam 264. For the beam splitter operation, the output fibers 270 and 280 need not be polarization-maintaining type fibers.

Unlike the bulk optical elements, such as beam splitter cubes and Wollaston prisms, utilized in some prior art optical PBC/S devices, a thin film wire-grid polarizer typically can accommodate a wider range of incidence angles θ1 and θ2. In turn, the input and output fibers can be positioned with relatively large offset distances 172, 182, and 192. In a thin film wire-grid polarizer that was fabricated with dimensions optimized for infrared application, the applicants were able to measure no significant degradation in performance of the polarizer for incidence angles up to about 20 degrees. One benefit of this aspect of the present invention is that more than one set of input and output fibers can be accommodated with only one set of optical elements, thus allowing multiplexing of optical signals with one set of optical elements.

Figure 9:
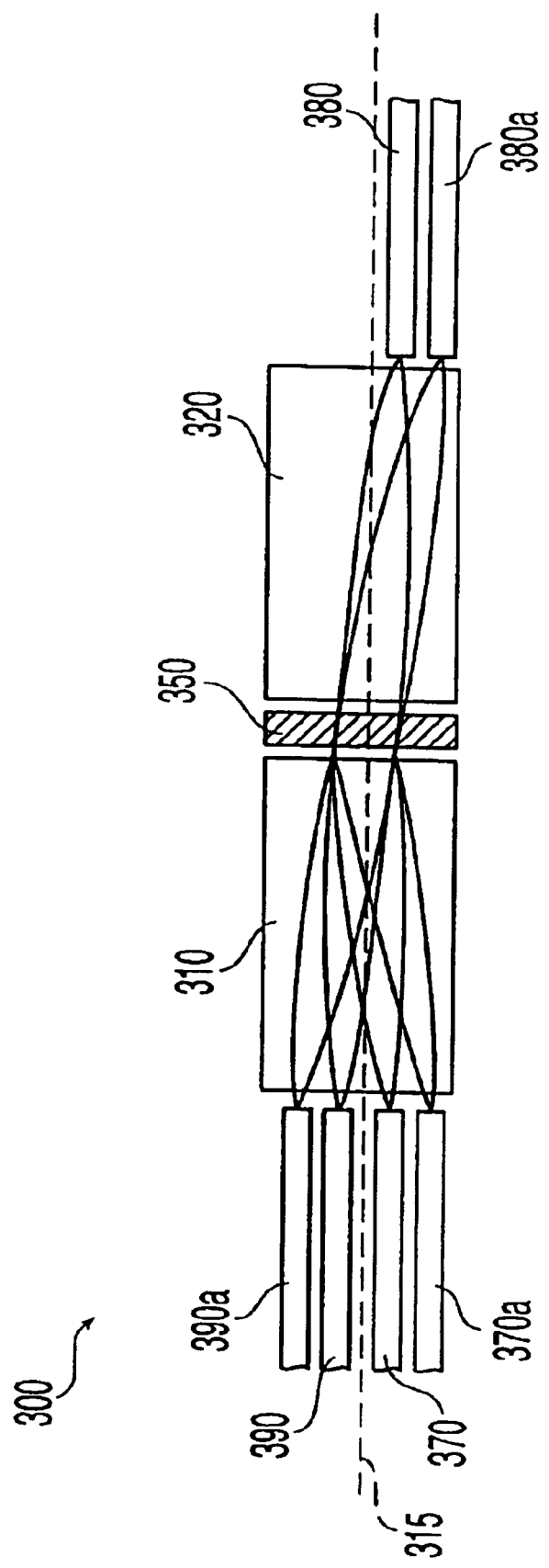
FIG. 9 illustrates an embodiment of the present invention where two optical PBC/S devices have been integrated into a single device.

FIG. 9 illustrates an embodiment of the invention having two sets of input and output fibers. Optical fibers 370, 380, and 390 represent one set of input/output fibers, and optical fibers 370a, 380a, and 390a represent a second set of input/output fibers. Each set can be used independently to combine two orthogonally polarized beams or to split an arbitrarily polarized beam into two orthogonally polarized component beams according to the principles discussed above in reference to FIGS. 4–8. For example, an arbitrarily polarized incident beam received through the optical fiber 390a will be split by thin film wire-grid polarizer 350 into two polarized component beams and exit via the optical fibers 380a and 370a. At the same time, two orthogonally polarized incident beams are received through the optical fibers 370 and 380, which will be combined by the thin film wire-grid polarizer 350 into a composite beam and exit via the optical fiber 390. As discussed above, for the beam combining operation, the two input fibers involved must be polarization-maintaining fibers. In effect, two functionally independent optical PBC/S devices are integrated into one package. Persons of ordinary skill in the art will appreciate that depending on the diameter of the collimating/focusing lenses 310 and 320, multiple sets of input and output fibers can be provided thus allowing higher functional integration of packaged optical devices.

Figure 10:
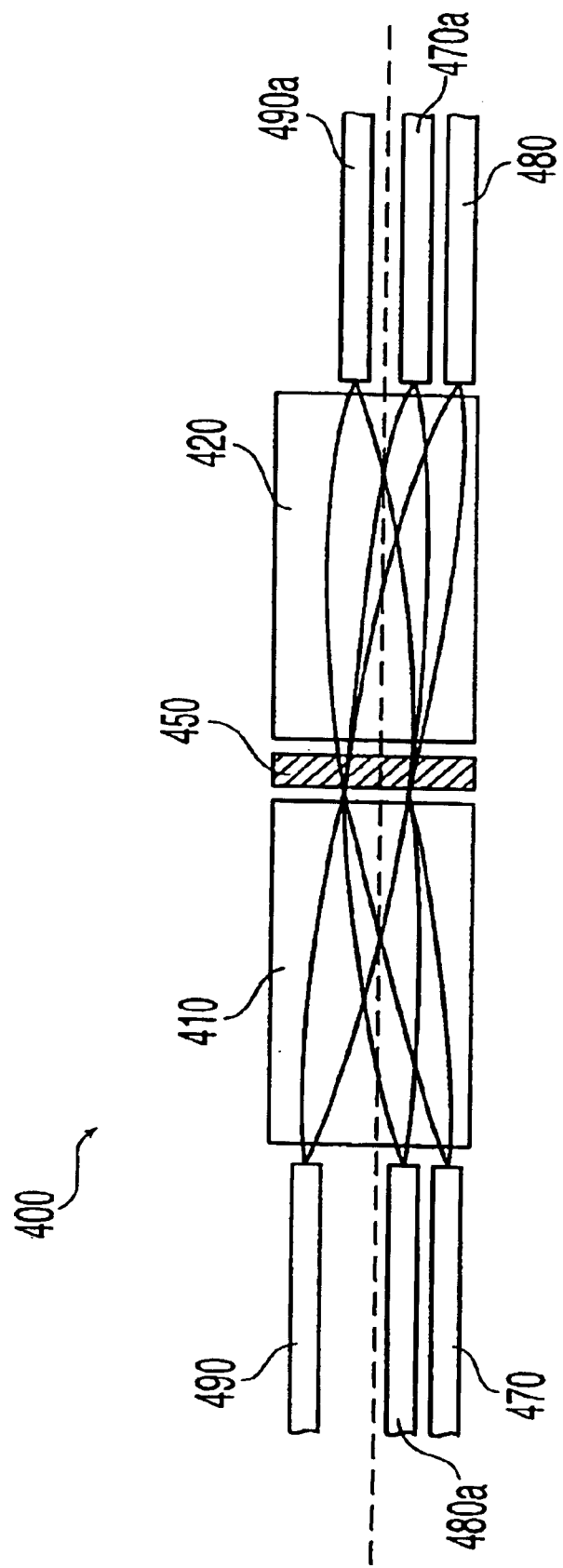
FIG. 10 illustrates another embodiment of the present invention.

FIG. 10 illustrates another configuration for the optical PBC/S device of FIG. 9. The optical PBC/S device 400 illustrated in FIG. 10 is also provided with two sets of input/output fibers. But in this embodiment, the optical fibers are configured so that there are equal number of fibers on both sides of the device. Optical fibers 470, 480, and 490 represent a first set of input/output fibers, and optical fibers 470a, 480a, and 490a represent a second set of input/output fibers. As with the optical PBC/S device of FIG. 9, each set can be used independently to combine two orthogonally polarized beams or to split an arbitrarily polarized beam into two orthogonally polarized component beams.

Figure 11A:
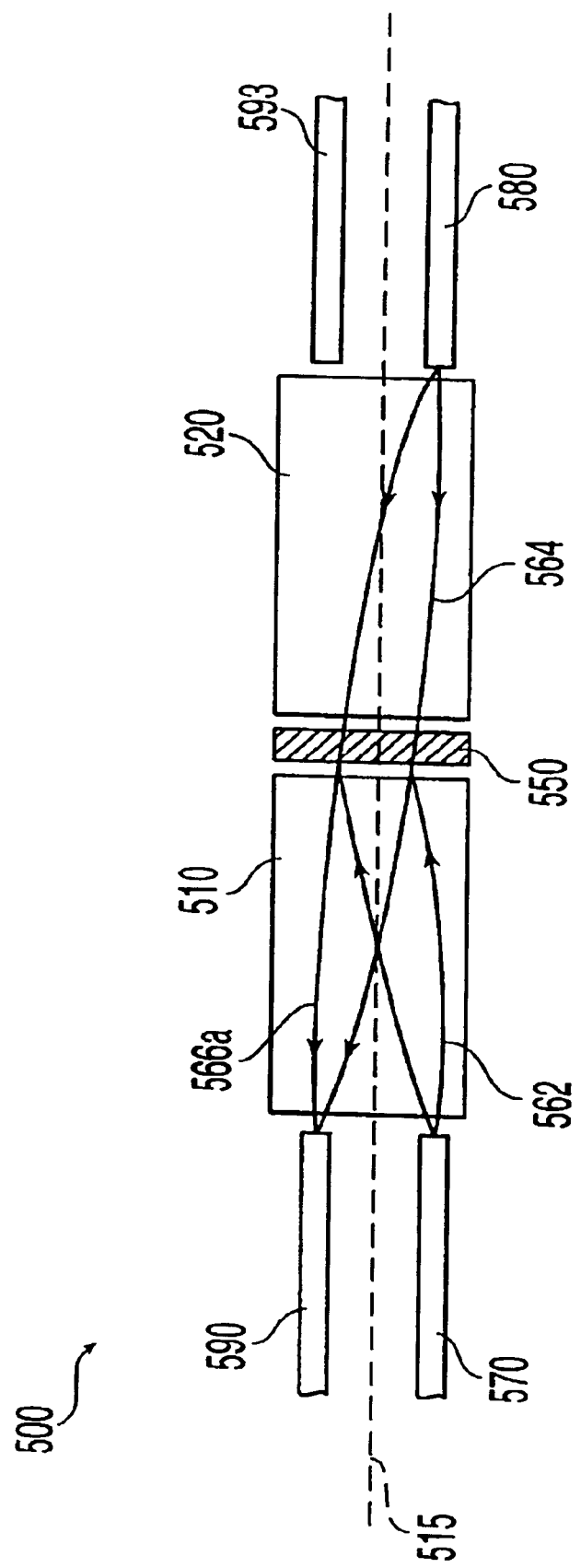
FIGS. 11a–11c illustrate an embodiment of the present invention where the thin film wire-grid polarizer is rotatably actuated.
Figure 11B:
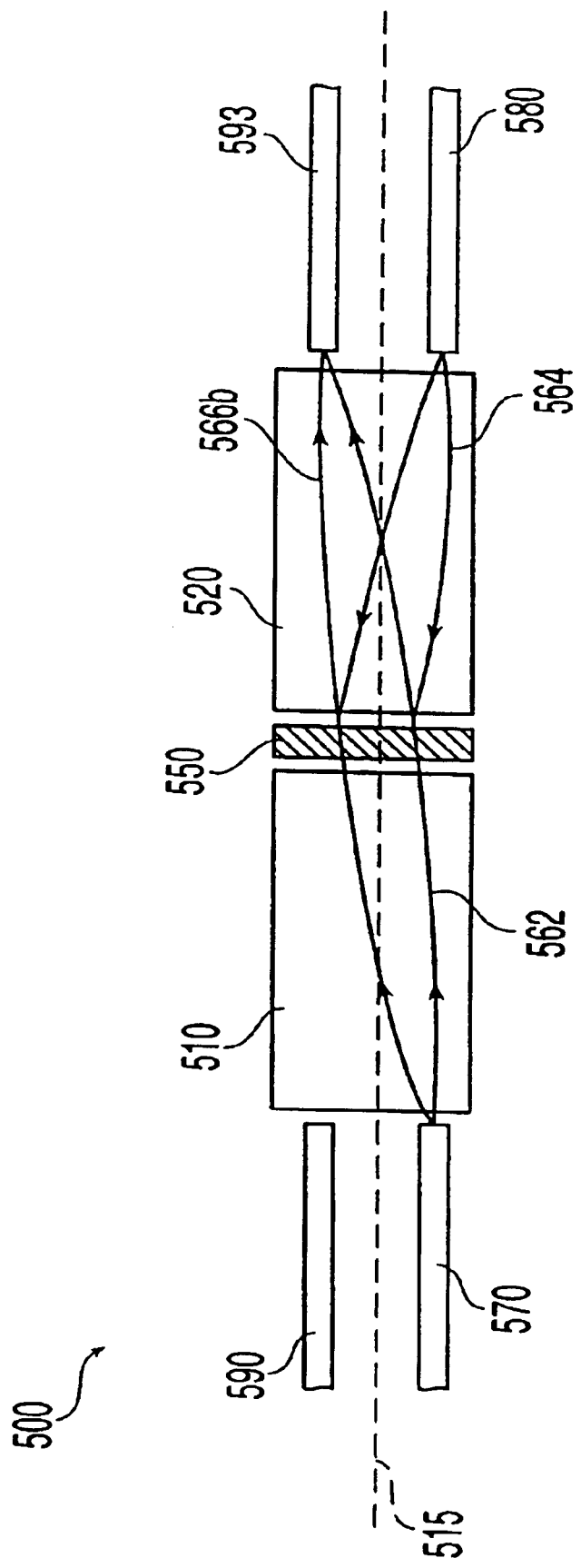

Another advantage realized by the optical PBC/S device of the present invention is illustrated by the optical PBC/S device 500 of FIGS. 11a and 11b. The optical PBC/S device 500 has a thin film wire-grid polarizer 550 positioned between two collimating/focusing lenses 510 and 520. Three input/output optical fibers 570, 580, and 590 are provided and configured such that the device can function as a beam splitter or a combiner according to the principles discussed in reference to the optical PBC/S devices 100 and 200 of FIGS. 7 and 8 respectively. But in the optical PBC/S device 500, a fourth optical fiber 593 has been added. The optical PBC/S device 500 is configured such that the position of the fourth optical fiber 593 is a mirror image of the optical fiber 590 with respect to the plane defined by the thin film wire grid on the thin film wire-grid polarizer 500.

By providing the fourth optical fiber 593, additional functionality can be realized for the PBC/S device 500. In this illustration, the optical PBC/S device 500 is set up as a basic beam combiner where two orthogonally polarized incident beams, 562 and 564 (S and P polarizations, respectively) are received through the input optical fibers 570 and 580, respectively. The thin film wire-grid polarizer 550 is oriented in its first position, in which, it will reflect the S polarized incident beam 562 and transmit the P polarized incident beam 564. Thus, as illustrated in FIG. 11a, the reflected and transmitted incident beams combine to form a composite depolarized output beam 566a that travels through the collimating/focusing lens 510 and is focused into the output fiber 590.

According to the present invention, by rotating the thin film wire-grid polarizer 550 about the optical axis 515 of the optical PBC/S device 500 from the basic beam combiner configuration, a part or all of the composite depolarized output beam can be redirected to the fourth optical fiber 593. FIG. 11b illustrates the optical PBC/S device 500 where the thin film wire-grid polarizer 550 has been rotated 90 degrees about the optical axis 515 from the basic beam combiner configuration of FIG. 11a into its second position so that the optical transmission axis of the thin film wire-grid polarizer 550 is now rotated 90 degrees. According to the principles discussed in reference to FIGS. 4–6, this will switch the thin film wire-grid polarizer's ability to reflect and transmit the two polarized incident beams so that, now, the S polarized incident beam from the input fiber 570 is transmitted and the P polarized incident beam from the input fiber 580 is reflected. The resulting composite depolarized output beam 566b will now exit the optical PBC/S device 500 through the fourth optical fiber 593. So the user can selectively direct the composite depolarized output beam between the two optical fibers 590 and 593 by rotating the thin film wire-grid polarizer between the first and the second positions. When desired, such operation can be automated by configuring the optical PBC/S device with an appropriate actuation mechanism that can rotate the thin film wire-grid polarizer 550 about the optical axis 515 of the device.

Figure 11C:
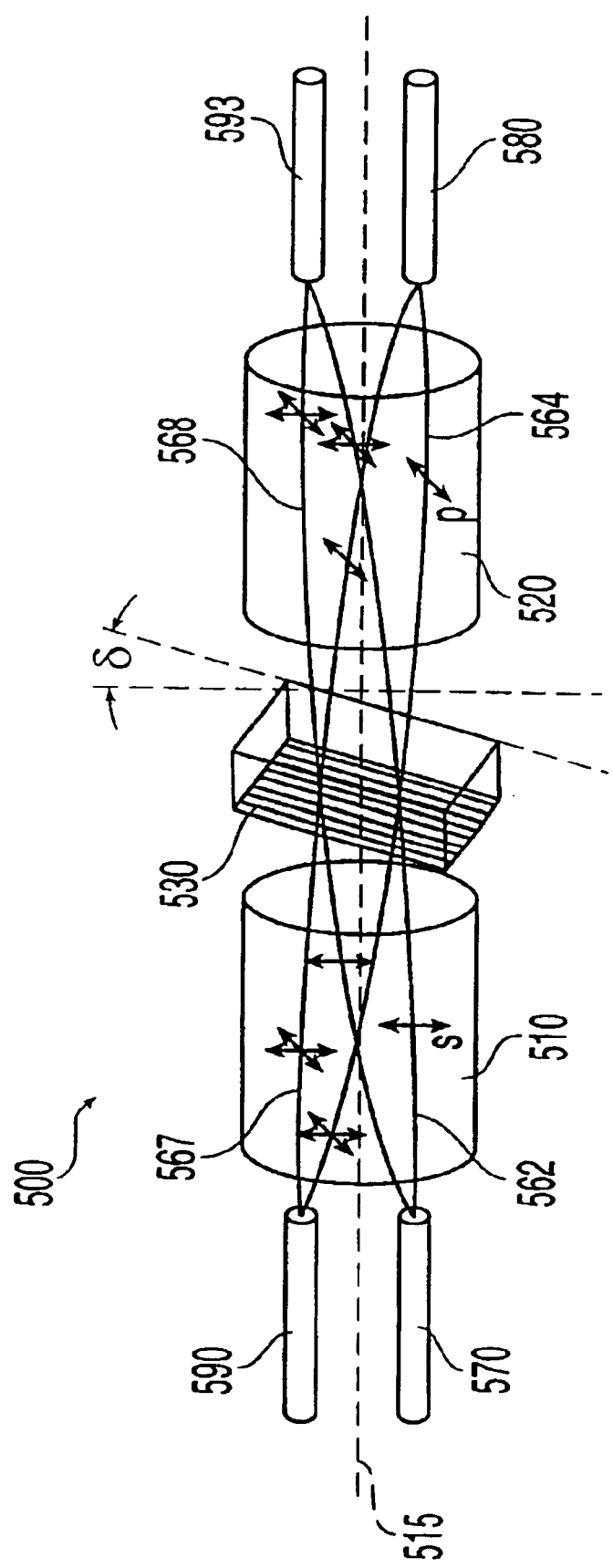

Furthermore, in this embodiment, the output beam can be selectively apportioned between the output fibers 590 and 593 by positioning the thin film wire-grid polarizer 550 between the two positions discussed above. Unlike other types of polarizers, metal wire-grid polarizers, such as the thin film wire-grid polarizers discussed here, will partially reflect and transmit the remainder of a polarized incident beam when the wire grid's optical transmission axis is oriented somewhere between 0 and 90 degrees with respect to the polarization state of the incident beam. In other words, the thin film wire-grid polarizer's optical transmission axis is between the first and the second positions, discussed above, that define the optimal reflection and transmission of S and P polarization states. FIG. 11c illustrates the PBC/S device 500 where the thin film wire-grid polarizer 550 is rotated by an angle δ from the basic beam-combiner configuration of FIG. 11a where the rotation angle δ is somewhere between 0 and 90 degrees. Since the thin film wire-grid polarizer 550 was oriented to maximize the reflection of S polarization beam and the transmission of P polarization beam in the basic beam-combiner configuration, a deviation by angle δ between 0 and 90 degrees will result in partial reflection and transmission of the incident beams.

As the angle δ changes between 0 and 90 degrees the proportion of the transmitted versus the reflected components of a given polarized incident beam changes continuously. When the rotation angle δ of the thin film wire-grid polarizer 550 about the optical axis 515 of the optical PBC/S device 500 is between 0 and 90 degrees, the optical transmission axis of the wire grid polarizer 550 is no longer aligned to any of the polarization states of the two incident beams. This offsets the optical transmission axis of the wire grid polarizer 550 from the optimal condition for reflecting the S polarized incident beam from the fiber 570 and transmitting the P polarized incident beam from the fiber 580. The result is that each incident beam is partially reflected and partially transmitted by the thin film wire-grid polarizer 550 and coupled to the output fibers 590 and 593.

In order to achieve the most efficient optical coupling from input fibers 570 and 580 to the two output fibers 590 and 593 simultaneously, the thin film wire-grid polarizer's wire-grid structures ideally must be positioned symmetrically with respect to the two collimating/focusing lenses 510 and 520 and the gap spacing between the two collimating/focusing lenses must be kept to a minimum. As previously discussed in reference to FIGS. 4–6, because thin film wire-grid polarizers can be fabricated on very thin substrate material, typically less than 0.5 mm, these conditions can be substantially satisfied by the optical PBC/S device of the present invention.

Figure 12:
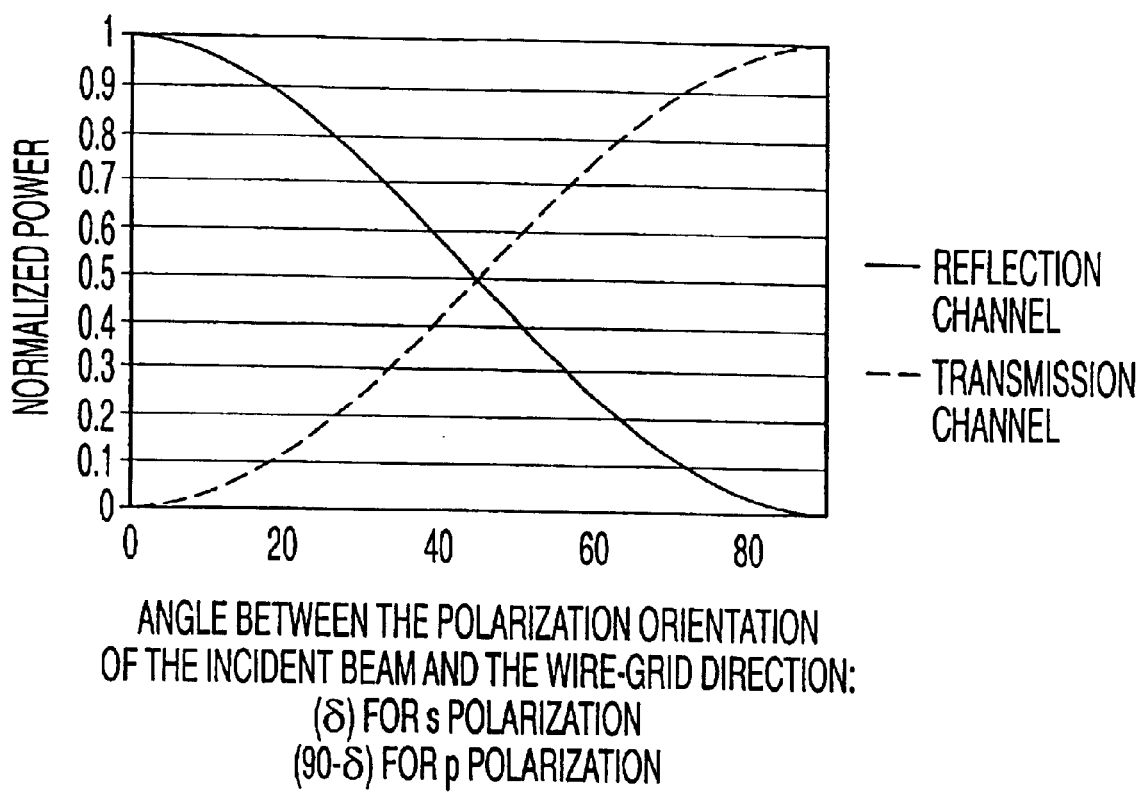
FIG. 12 is a plot graph of calculated transmittance and reflectance of polarized light through a metal wire-grid polarizer.

The graph of FIG. 12 illustrates this partial reflectance/transmittance effect. In the graph, the calculated power levels of reflected and transmitted beams through a thin film wire-grid structure are plotted as functions of the rotation angle δ. The Y-axis represents the normalized power level of an output beam and the X-axis represents the angle between the polarization orientation of the incident beam and the wire grid direction (which is δ for a S polarized incident beam and (90-δ) for P polarized incident beam). As illustrated in the graph, for a given angle δ, each of the P and S polarized incident beams will be split into two component output beams (a reflected beam and a transmitted beam) by a metal wire-grid polarizer in inverse proportions. The reflected output beam's power level follows the basic $cosine^2$ function and the transmitted output beam's power level follows the basic $sine^2$ function. Thus, notwithstanding some negligible power loss through the thin film wire-grid polarizer, the power levels for the two component output beams at any given angle δ will add up to 1.0 on the normalized scale. And, as long as the two incident beams are of equal power, the composite depolarized output beams at the fibers 590 and 593 will always be equally balanced between S and P polarizations.

Another practical implication of this partial reflectance/transmittance effect is that, by keeping the rotation angle δ of the thin film wire-grid polarizer 550 small, the fourth optical fiber 593 can be used as a tapping port to tap a small fraction of the output beam of the beam combiner to monitor the power level. When the rotation angle δ is small, while a majority of the S polarized incident beam from the fiber 570 is reflected, a small fraction of the S polarized incident beam is transmitted through the thin film wire-grid polarizer 550 and focused into the fourth optical fiber 593. Similarly, while the majority of the P polarized incident beam from the fiber 580 is transmitted, the same small fraction of the P polarized incident beam is reflected by the thin film wire-grid polarizer 550 and also focused into the fourth optical fiber 593. Thus, the output beam focused into the fourth optical fiber 593 is also a composite beam composed of the same proportion of S and P polarized component beams as the main output beam observed at the output fiber 590 and the power level of the combined output beam observed at the fourth optical fiber 593 is proportional to the power level of the main output beam according to the graph illustrated in FIG. 12. Thus, the fourth optical fiber 593 can be used to tap a small fraction of the combined output beam to monitor its power level. The tapped output beam can be diverted to an optical detector for this purpose. Although tapping the output beams is commonly practiced with prior art optical beam combiners to monitor power level of the output beam, the prior art optical beam combiners require additional beam splitting hardware to tap the output beam. Thus, the optical PBC/S device of the present invention significantly improves integration of packaged optical PBC/S optical device by eliminating the additional hardware to tap the output beam.

Persons of ordinary skill in the art would appreciate that the thin film wire-grid polarizer 550 in the optical PBC/S device 500 can be permanently configured to provide a tapping port that taps a fixed fraction of the main combined output beam or, alternatively, configured with a rotating actuation mechanism. By attaching the thin film wire-grid polarizer 550 to a rotating actuation mechanism, the power level of the output beams at either of the output fibers 590 and 593 can be tuned to a desired level. This ability to provide variable output power avoids the need to use an additional variable optical attenuator where control of the combined beam output power is desired.

As illustrated in the graph of FIG. 12, when the thin film wire-grid polarizer's rotational angle δ is 45 degrees, the polarized incident beam is equally split into two component output beams. Thus, by inputting two orthogonally polarized incident beams 562 and 564 of equal power level, two depolarized output beams having the same output power can be obtained. This is very useful in many applications for optical amplifiers. In optical amplifiers such as distributed gain Raman amplifiers, a pumping scheme with two depolarized light of equal power is essential to reduce nose and optimize amplification.

In another application of the optical PBC/S device of the present invention, the optical PBC/S device, in conjunction with a Fiber Bragg grating, can be used to simultaneously lock two pump lasers. Using the optical PBC/S device 500 of the present invention, orthogonally polarized beams from two pump lasers are combined into a depolarized beam. In this application, the optical PBC/S device 500 is configured to tap a small fraction of the output beam through the fourth optical fiber 593 and coupled to a Fiber Bragg grating. The Fiber Bragg grating will then reflect a narrow band of the spectrum back into the optical PBC/S device which is routed back to the two pump lasers by the optical PBC/S device. This optical feedback serves to lock the two pump lasers' wavelength to the central wavelength of the Fiber Bragg grating.

Another advantage of providing the fourth optical fiber 593 is realized when the optical PBC/S device 500, of FIGS. 11a–11c, is used in a beam splitter mode. In this mode, the incident beam can be received through either one of the optical fibers 590 or 593 and one can select which of the two optical fibers 570 and 580 should output S or P polarized output beam by rotating the thin film wire-grid polarizer 550 between two positions that are 90 degrees apart. For example, where the incident beam is received through the optical fiber 590, by orienting the thin film wire-grid polarizer 550 so that its optical transmission axis is orthogonal to the polarization orientation of an S polarized beam, the thin film wire-grid polarizer 550 will reflect the S polarized component of the incident beam and direct it towards the optical fiber 570. At the same time, the thin film wire-grid polarizer 550 will transmit the P polarized component of the incident beam and direct it towards the optical fiber 580. The output location of the S and P polarized beams can be switched between the optical fibers 570 and 580 by rotating the thin film wire-grid polarizer 550 by 90 degrees.

Figure 13:
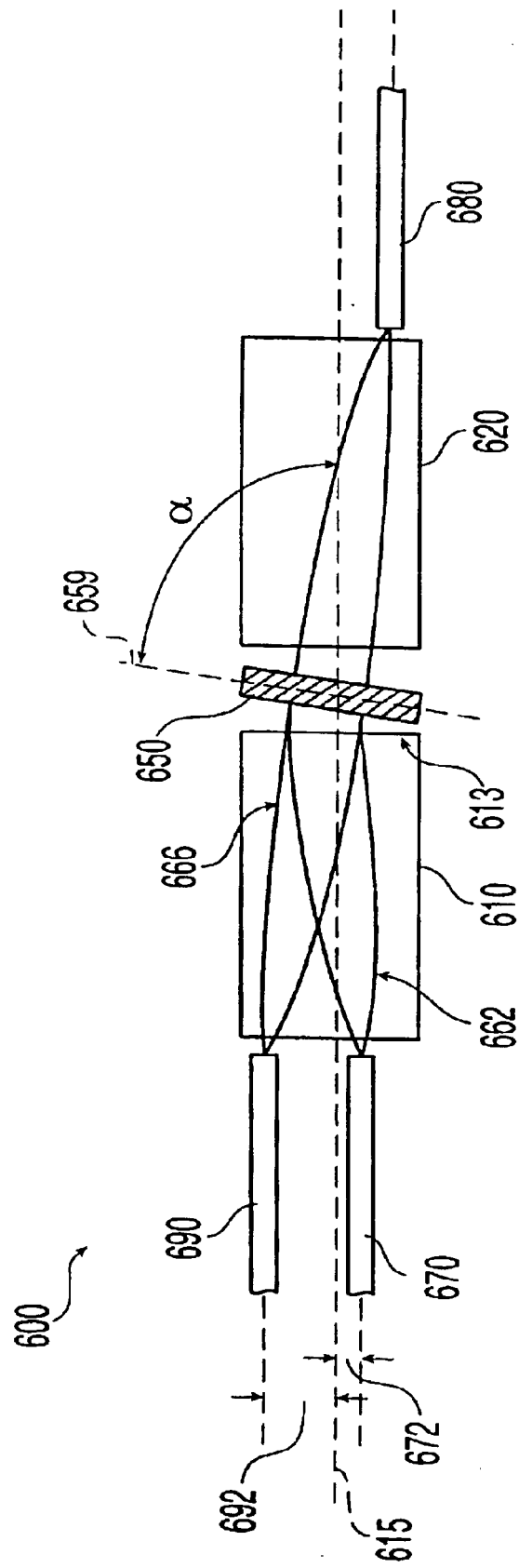
FIG. 13 illustrates an embodiment of the present invention where the optical fibers are provided in ferrules that hold the optical fibers in predetermined positions and orientation.

FIG. 13 illustrates yet another embodiment of the present invention in which the benefit of a thin film wire-grid polarizer's ability to accommodate a wider range of incidence angles is utilized in optical PBC/S device 600. The optical PBC/S device 600 is configured to accommodate a non-symmetric positioning of the input and output fibers. The device 600 is provided with a basic set of optical fibers 670, 680, and 690. When the device 600 is operated as a beam combiner, the optical fibers 670 and 680 are used as the input fibers and the optical fiber 690 is used as the output fiber. When the device 600 is operated as a beam splitter, the three optical fibers switch their input/output roles. In the embodiments of the present invention previously discussed, the thin film wire-grid polarizer is always orthogonally positioned with respect to the optical axis of the optical PBC/S device and the optical fibers are symmetrically positioned about the optical axis of the optical PBC/S device to ensure that the beams align and focus properly into the appropriate fibers. The orthogonal orientation of the thin film wire-grid polarizer also ensures, that the gap between the two collimating/focusing lenses in which the thin film wire-grid polarizer sits is kept as small as possible to achieve the most compact configuration for the optical PBC/S device. In this embodiment, however, the thin film wire-grid polarizer is allowed to deviate from its orthogonal orientation with respect to the optical axis of the optical PBC/S device to accommodate non-symmetric arrangement of the optical fibers 670, 680, and 690.

As illustrated in FIG. 13, the optical fibers 670, 680, and 690 are not symmetrically positioned about the optical axis 615. The offset distances 672 and 692 of the optical fibers 670 and 690, respectively, are not equal. This non-symmetric positioning of the optical fibers, however, is compensated by tilting the thin film wire-grid polarizer 650 by a tilt angle $\alpha$. Because the thin film wire-grid polarizer 650 is relatively thin (typically less than 1.0 mm) the polarizer can be tilted without necessarily increasing the gap spacing between the two collimating/focusing lenses 610 and 620 substantially. Persons of ordinary skill in the art will appreciate that actual dimensions of the thin film wire-grid polarizer and the collimating/focusing lenses will determine the gap spacing required between the two collimating/focusing lenses to accommodate a given tilt angle $\alpha$. But, because thin film wire-grid polarizers are much thinner than the polarizers employed in prior art optical PBC/S devices, the optical PBC/S device of the present invention can better accommodate non-symmetrically positioned input/output optical fibers without compromising the overall compactness of the optical PBC/S device.

Because the offset distance 672 is smaller than the offset distance 692, if the thin film wire-grid polarizer 650 were positioned orthogonally, the exit angle of the incident beam 662 at the inwardly-facing surface 613 of the collimating/focusing lens 610 will be too shallow and the reflected output beam 666 will not focus into the output fiber 690. But, by adjusting the tilt angle $\alpha$ of the thin film wire-grid polarizer 650, the incident beam 662 can be reflected back into the collimating/focusing lens 610 at a proper angle and focused into the output fiber 690. This aspect of the invention provides the flexibility to use the optical PBC/S device in an application that may not allow symmetrical placement of the optical fibers.

It is generally known in the art that in optical PBC/S devices, the optical fibers can be secured in ferrules in predetermined configuration for easier handling of the optical fibers. By securing the optical fibers in ferrules, properly aligning the fibers with respect to the optical axis of the PBC/S device is simplified. The various embodiments of the PCB/S device according to the present invention discussed herein also can be readily configured with such ferrule-mounted optical fibers as input/output optical beam carriers. Each ferrule can be configured to hold at least one pair of optical fibers where one of the optical fibers is a polarization-maintaining fiber and the other optical fiber is a standard optical fiber. That will allow at least one polarization-maintaining fibers on each end of the PBC/S device that can be used as input/output optical beam carriers depending on whether the PBC/S device is used as a beam combiner or a splitter. The polarization-maintaining fibers can be secured in their respective ferrules in predetermined orientation for ease of use, so that their optical axes are orthogonal to each other when mounted onto the PBC/S device.

Compared to prior art optical PBC/S devices that utilize bulk optical elements, the optical PBC/S device of the present invention provides, among other benefits, polarization functionality in a compact format because the thin film wire-grid polarizers can be readily fabricated to have a thickness in sub-millimeter range rather than millimeter dimensions of the bulk optical elements. Furthermore, utilizing such recently developed techniques such as nanoimprinting lithography, thin film wire grid structures of sub-micron dimensions can be fabricated cost efficiently compared to alternative lithographic methods. Fabrication of such submicron scale wire grid structures is described in ZHAONING YU, PARU DESHPANDE, WEI WU, JIAN WANG, AND STEPHEN Y. CHOU, *Reflective Polarizer Based on a Stacked Double-Layer Subwavelength Metal Grating Structure Fabricated Using Nanoimprint Lithography*, APPL. PHYS. LETT. Vol. 77, No. 7, 927 (Aug. 14, 2000).

Applying the nanoimprinting lithography, thin film wire-grid polarizers on substrates of thickness in the range of about 200–1000 $\mu$m is readily achieved. Thus, the optical PBC/S device of the invention requires much smaller separation between the two collimating/focusing lenses compared to prior art devices utilizing bulk optical elements whose dimensions are in millimeters. For a thin film wire-grid polarizer that is 500 $\mu$m thick the gap between the collimating/focusing lenses can be kept as small as 500 $\mu$m. The result is that, according to the present invention, a very compact optical PBC/S device that is significantly smaller than the prior art packaged optical PBC/S devices can be provided.

Figure 14:
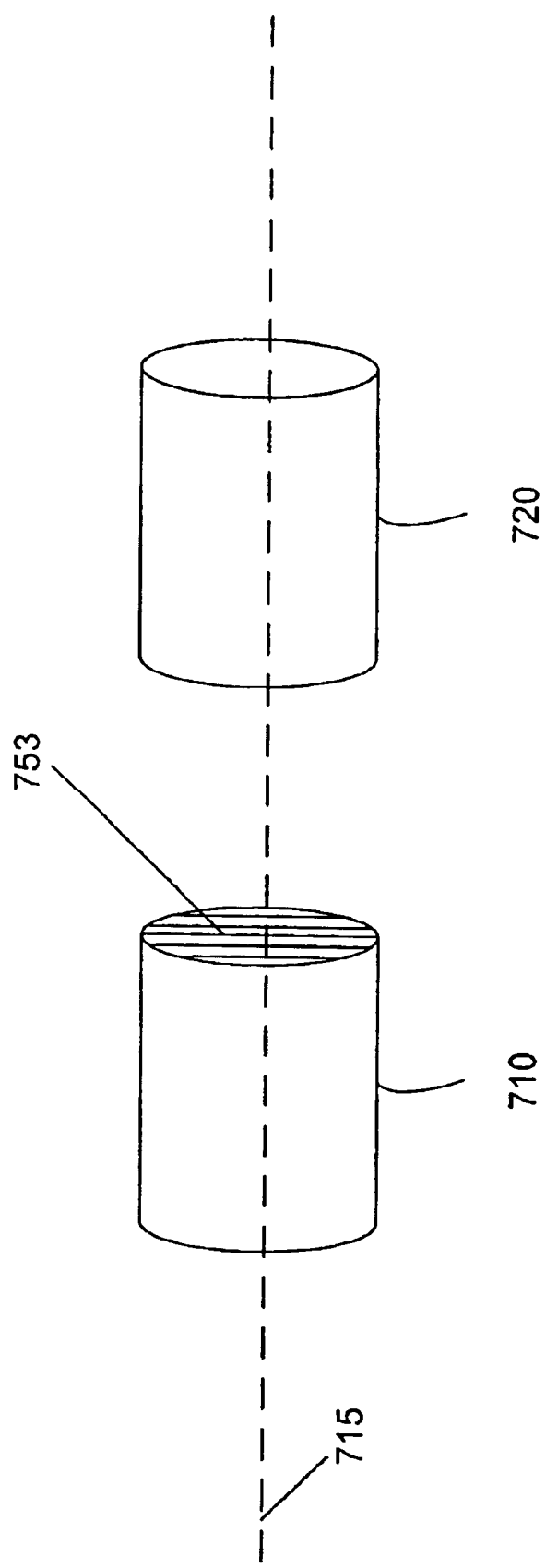
FIG. 14 illustrates another embodiment of the invention.

Furthermore, a performance advantage may also be realized. A smaller gap between the collimating/focusing lenses lowers the device's insertion loss caused by the diffraction between the collimating/focusing lenses. In that regard, as shown in FIG. 14, even further improvement can be achieved by providing the thin film wire grid structures 753 directly on the inwardly-facing surface of one of the collimating/focusing lenses 710, 720. This eliminates the need for a separate substrate material for the thin film wire grid structures and can reduce the spacing between the collimating/focusing lenses down to the thickness of the thin film wire grid structures which are 1 $\mu$m or less.

Many modifications and variations are possible in view of the above teachings. The embodiments were chosen and described in order to best explain the principles of the invention and its practical applications, to thereby enable others skilled in the art to best utilize the invention and various embodiments with various modifications as is suited to the particular use contemplated. It is intended that the scope of the invention be defined by the appended claims and their equivalents.

We claim:

1. An optical polarization beam combiner/splitter device comprising:
    a first optical beam carrier for carrying a first polarized beam;
    a second optical beam carrier for carrying a second polarized beam whose polarization is orthogonal to the polarization of the first polarized beam;
    a first and a second collimating/focusing lenses, each having an inwardly-facing surface, and an optical axis, the two collimating/focusing lenses oriented coaxially so that their optical axes are aligned collinearly, defining an optical axis of the device, and their inwardly-facing surfaces are facing each other;
    the two collimating/focusing lenses positioned between the first and second optical carriers, the optical beam carriers positioned equidistant from the optical axis of the device and oriented coaxially to each other,
    a third optical beam carrier for carrying a non-polarized beam positioned on the same side of the two collimating/focusing lenses as the first optical beam carrier and positioned equidistant from the optical axis of the device as the first optical beam carrier; and
    a thin film wire-grid polarizer disposed between the first and second collimating/focusing lenses.

2. An optical polarization beam combiner/splitter device according to claim 1, wherein the first and second optical beam carriers are polarization-maintaining optical fibers.

3. An optical polarization beam combiner/splitter device according to claim 1, wherein the third optical beam carrier is an optical fiber.

4. An optical polarization beam combiner/splitter device according to claim 1, further comprising a first ferrule and a second ferrule;
    the first and second optical beam carriers are polarization-maintaining optical fibers and the third optical beam carrier is an optical fiber, wherein the first and third optical beam carriers are held within the first ferrule and the second optical beam carrier is held within the second ferrule.

5. An optical polarization beam combiner/splitter device according to claim 1, wherein the thing film wire-grid polarizer is provided on the inwardly-facing surface of one of the collimating/focusing lenses.

6. An optical polarization beam combiner/splitter device according to claim 1, wherein the thin film wire-grid polarizer comprises nano-scale thin film wire grid structures.

7. an optical polarization beam combiner/splitter device according to claim 6, wherein the thin film wire grid has a grid period of about 150 nm to 250 nm and a fill ratio between 20–50%.

8. An optical polarization beam combiner/splitter device according to claim 6, wherein the thin film wire grid has a grid period of about 50 nm to 150 nm and a fill ratio of about 25–75%.

9. An optical polarization beam combiner/splitter device according to claim 6, wherein the thin film wire grid has a grid period of no greater than 300 nm and a fill ratio of no more than 50%.

10. An optical polarization beam combiner/splitter device according to claim 1, wherein a plane defined by the thin film wire-grid polarizer is orthogonal to the optical axis of the device.

11. An optical polarization beam combiner/splitter device according to claim 1, further comprising:
    at least one more set of optical beam carriers are provided to handle another set of beams.

12. An optical polarization beam combiner/splitter device according to claim 1, further comprising:
    a fourth optical beam carrier for carrying a non-polarized beam positioned on the same side of the two collimating/focusing lenses as the second optical beam carrier and positioned equidistant from the optical axis of the device as the second optical beam carrier so that when two orthogonally polarized incident beams are individually received through the first and second optical beam carriers, the thin film-wire-grid polarizer combines the two polarized incident beams into a composite depolarized output beam that can be directed to at least one of the third and the fourth optical beam carriers.

13. An optical polarization beam combiner/splitter device according to claim 12, wherein the composite depolarized output beam can be directed to at least one of the third and the fourth optical beam carriers by rotating the tin film wire-grid polarizer about the optical axis of the device between a first position and a second position;
    the first position defined by an orientation of the thin film wire-grid polarizer in which the thin film wire-grid polarizer will reflect the first polarized incident beam received through the first optical beam carrier and transmit the second polarized incident beam received through the second optical beam carrier so that the composite depolarized output beam is directed to the third optical beam carrier; and
    the second position defined by an orientation of the thin film wire-grid polarizer in which the thin film wire-grid polarizer will transmit the first polarized incident beam received through the first optical beam carrier and reflect the second polarized incident beam received through the second optical beam carrier so that the composite depolarized output beam is directed to the fourth optical beam carrier.

14. An optical polarization beam combiner/splitter device according to claim 13, wherein the composite depolarized output beam can be apportioned between the third and the fourth optical beam carriers by positioning the thin film wire-grid polarizer between the first and the second position.

15. An optical polarization beam combiner/splitter device according to claim 12, further comprising a first ferrule and a second ferrule;
    the first and second optical beam carriers are polarization-maintaining optical fibers and the third and fourth optical beam carriers are optical fibers, wherein the first and third optical beam carriers are held within the first ferrule and the second and fourth optical beam carriers are held within the second ferrule.

16. An optical polarization beam combiner device comprising:
    a first optical beam source for providing a first polarized incident beam;
    a second optical beam source for providing a second polarized incident beam whose polarization state is orthogonal to the polarization state of the first polarized incident beam;
    a first and second collimating/focusing lenses, each having an inwardly-facing surface, an outwardly-facing surface, and an optical axis, the two collimating/focusing lenses oriented coaxially so that their optical axes are aligned collinearly, defining an optical axis o the device, and their inwardly-facing surfaces are facing each other;
    the two collimating/focusing lenses positioned between the first and second optical beam sources so that the first and second polarized incident beams are directed parallel to the optical axis of the device;

an optical beam carrier for carrying a non-polarized beam positioned on the same side of the two collimating/focusing lenses as the first optical beam source; and a thin film wire-grid polarizer disposed between the first and second collimating/focusing lenses so that the first polarized incident beam is reflected from the thin film wire-grid polarizer as a reflected beam and directed through the first collimating/focusing lens along a first path disposed at a first angle with respect to the optical axis of the device and the second polarized incident beam is transmitted through the thin film wire-grid polarizer and directed through the first collimating/focusing lens along the first path, combining with the reflected beam forming a composite output beam, wherein the optical beam carrier is disposed at a location so that the first collimating/focusing lens focuses the composite output beam into the optical beam carrier.

17. An optical polarization beam combiner device according to claim 16, wherein the first and second optical beam sources are polarization-maintaining optical fibers.

18. An optical polarization beam combiner device according to claim 16, wherein the optical beam carrier is an optical fiber.

19. an optical polarization beam combiner device according to claim 16, wherein the thin film wire-grid polarizer is provided on the inwardly-facing surface of one of the collimating/focusing lenses.

20. An optical polarization beam combiner device according to claim 16, wherein the thin film wire-grid polarizer comprises nano-scale thin film wire-grid structures.

21. An optical polarization beam combiner device according to claim 20, wherein the thin film wire grid has a grid period of about 150 nm to 250 nm and a fill ratio between 20–50%.

22. An optical polarization beam combiner device according to claim 20, wherein the thin film wire grid has a grid period of about 50 nm to 150 nm and a fill ratio of about 25–75%.

23. An optical polarization beam combiner device according to claim 20, wherein the thin film wire grid has a grid period of no greater than 300 nm and a fill ratio of no more than 50%.

24. An optical polarization beam combiner device according to claim 16, wherein the thin film wire-grid polarizer is positioned at a non-orthogonal angle with respect to the optical axis of the device so that the first and second beam sources need not be equidistant from the optical axis of the device.

25. An optical polarization beam combiner device according to claim 16, wherein the optical beam carrier is an optical fiber for carrying a non-polarized beam.

26. an optical polarization beam combiner device according to claim 16, further comprising:

at least one more set of optical beam sources and an optical beam carrier provided to handle another set of beams.

27. An optical polarization beam splitter device comprising:

a first optical beam carrier for carrying a first component output beam having a first polarization state;

a second optical beam carrier for carrying a second component output beam having a polarization state orthogonal to the first polarization state;

a first and second collimating/focusing lenses, each having an inwardly-facing surface, an outwardly-facing surface, and an optical axis, the two collimating/focusing lenses oriented coaxially so that their optical axes are aligned collinearly, defining an optical axis of the device, and their inwardly-facing surfaces are facing each other;

the two collimating/focusing lenses positioned between the first and second optical beam carriers;

an optical beam source providing a non-polarized incident beam positioned on the same side of the two collimating/focusing lenses as the first optical beam carrier;

a thin film wire-grid polarizer disposed between the first and second collimating/focusing lenses so that a first component output beam of the incident beam is reflected from the thin film wire-grid polarizer and directed through the first collimating/focusing lens along a first path disposed at a first angle with respect to the optical axis of the device and a second component output beam of the incident beam is transmitted through the thin film wire-grid polarizer and directed through the second collimating/focusing lens along a second path disposed at a second angle with respect to the optical axis of the device;

the first and second angles being substantially symmetrical about the optical axis of the device;

the first optical beam carrier disposed at a location so that the first collimating/focusing lens focuses the first component output beam into the first optical beam carrier; and the second optical beam carrier disposed at a location so that the second collimating/focusing lens focuses the second component output beam into the second optical beam carrier.

28. An optical polarization beam splitter device according to claim 27, wherein the first and second optical beam carriers are polarization-maintaining optical fibers.

29. An optical polarization beam splitter device according to claim 27, wherein the optical beam source is an optical fiber for carrying a non-polarized beam.

30. An optical polarization beam splitter device according to claim 27, wherein the thin film wire-grid polarizer is provided on the inwardly-facing surface of one of the collimating/focusing lenses.

31. An optical polarization beam splitter device according to claim 27, wherein the thin film wire-grid polarizer comprises nano-scale thin film wire grid structures.

32. An optical polarization beam splitter device according to claim 31, wherein the thin film wire grid has a grid period of about 150 nm to 250 nm and a fill ratio between 20–50%.

33. An optical polarization beam splitter device according to claim 31, wherein the thin film wire grid has a grid period of about 50 nm to 150 nm and a fill ratio of about 25–75%.

34. An optical polarization beam splitter device according to claim 31, wherein the thin film wire grid has a grid period of no greater than 300 nm and a fill ratio of no more than 50%.

35. An optical polarization beam splitter device according to claim 27, further comprising:

at least one more set of optical beam carriers and an optical beam source provided to handle another set of beams.

* * * * *